(12) United States Patent
Sasakawa et al.

(10) Patent No.: US 10,840,563 B2
(45) Date of Patent: Nov. 17, 2020

(54) SECONDARY BATTERY, BATTERY PACK, AND VEHICLE

(71) Applicant: KABUSHIKI KAISHA TOSHIBA, Minato-ku (JP)

(72) Inventors: Tetsuya Sasakawa, Yokohama (JP); Kazuomi Yoshima, Yokohama (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 167 days.

(21) Appl. No.: 15/691,879

(22) Filed: Aug. 31, 2017

(65) Prior Publication Data

US 2018/0277904 A1    Sep. 27, 2018

(30) Foreign Application Priority Data

Mar. 21, 2017   (JP) .................. 2017-054656

(51) Int. Cl.
| | | |
|---|---|---|
| *H01M 10/42* | (2006.01) | |
| *H01M 2/24* | (2006.01) | |
| *H01M 10/04* | (2006.01) | |
| *H01M 10/0585* | (2010.01) | |

(Continued)

(52) U.S. Cl.
CPC ......... *H01M 10/4257* (2013.01); *H01M 2/24* (2013.01); *H01M 10/0413* (2013.01); *H01M 10/0463* (2013.01); *H01M 2/021* (2013.01); *H01M 10/052* (2013.01);

(Continued)

(58) Field of Classification Search
CPC .......... H01M 10/4257; H01M 2/1077; H01M 10/0463; H01M 10/0413; H01M 2/24; H01M 2/021; H01M 10/052; H01M 2220/20; H01M 2010/4271; H01M 10/0585; H01M 10/0418; H01M 10/425; H01M 2/26; H01M 2/34; H01M 10/0525; H01M 10/058

See application file for complete search history.

(56) References Cited

U.S. PATENT DOCUMENTS

| | | | |
|---|---|---|---|
| 6,245,461 B1 | 6/2001 | Smith et al. | |
| 6,743,546 B1 * | 6/2004 | Kaneda ................. | H01M 2/021 429/127 |
| 2004/0038123 A1 | 2/2004 | Hisamitsu et al. | |

(Continued)

FOREIGN PATENT DOCUMENTS

| | | |
|---|---|---|
| JP | 9-199179 A | 7/1997 |
| JP | 2003/257381 A | 9/2003 |

(Continued)

OTHER PUBLICATIONS

Machine translation of JP 2007-172943, Tanjo Yuji, 2007 (Year: 2007).*

*Primary Examiner* — Maria Laios
*Assistant Examiner* — Kwang Han
(74) *Attorney, Agent, or Firm* — Oblon, McClelland, Maier & Neustadt, L.L.P.

(57) ABSTRACT

In one embodiment, a secondary battery includes, electrode groups, an insulating sheet, and a container member. The insulating sheet is disposed between the electrode groups. At least part of the insulating sheet is joined to the container member. The container member covers the outside of a stack having the electrode groups and the insulating sheet.

14 Claims, 15 Drawing Sheets

(51) Int. Cl.
  *H01M 10/052* (2010.01)
  *H01M 2/02* (2006.01)
(52) U.S. Cl.
  CPC .......................... *H01M 10/0585* (2013.01);
    *H01M 2010/4271* (2013.01); *H01M 2220/20*
    (2013.01)

(56) References Cited

U.S. PATENT DOCUMENTS

| | | | |
|---|---|---|---|
| 2007/0281214 A1* | 12/2007 | Saruwatari | H01M 4/131 |
| | | | 429/231.95 |
| 2009/0208831 A1 | 8/2009 | Tanino | |
| 2012/0058371 A1 | 3/2012 | Carignan | |
| 2012/0202105 A1* | 8/2012 | Shinyashiki | H01M 2/266 |
| | | | 429/153 |
| 2015/0015596 A1 | 1/2015 | Nagatomi et al. | |
| 2015/0132617 A1 | 5/2015 | Petruzzi | |
| 2015/0155596 A1 | 6/2015 | Gardner | |
| 2016/0036090 A1 | 2/2016 | Sasakawa et al. | |
| 2017/0373298 A1* | 12/2017 | Kitoh | H01M 10/30 |
| 2018/0083252 A1 | 3/2018 | Yoshima et al. | |
| 2018/0277906 A1 | 9/2018 | Yoshima et al. | |

FOREIGN PATENT DOCUMENTS

| | | | | |
|---|---|---|---|---|
| JP | 3866740 B2 | | 1/2007 | |
| JP | 2007-172943 | * | 7/2007 | .............. H01M 2/02 |
| JP | 2007-172943 A | | 7/2007 | |
| JP | 2009-199825 A | | 9/2009 | |
| JP | 2011-175849 A | | 9/2011 | |
| JP | 2015-520935 A | | 7/2015 | |
| JP | 5894162 B2 | | 3/2016 | |
| JP | 2016-146359 | | 8/2016 | |
| JP | 2018-49719 | | 3/2018 | |
| JP | 2018-156901 A | | 10/2018 | |
| KR | 10-2010-0101762 A | | 9/2010 | |
| KR | 10-2013-0136141 A | | 12/2013 | |
| WO | WO 2016/147497 | * | 9/2016 | ............ H01M 10/30 |

* cited by examiner

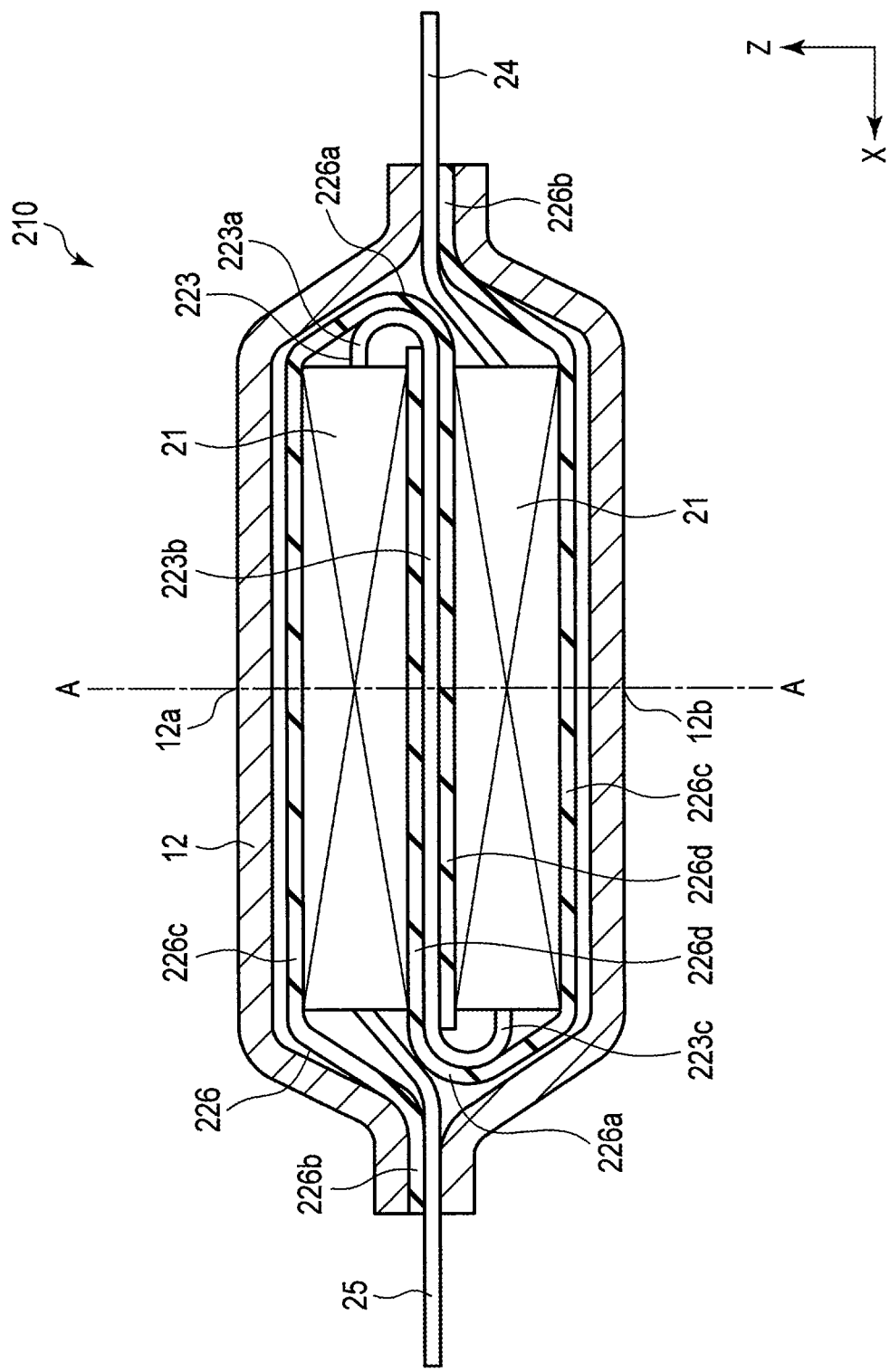
F I G. 5

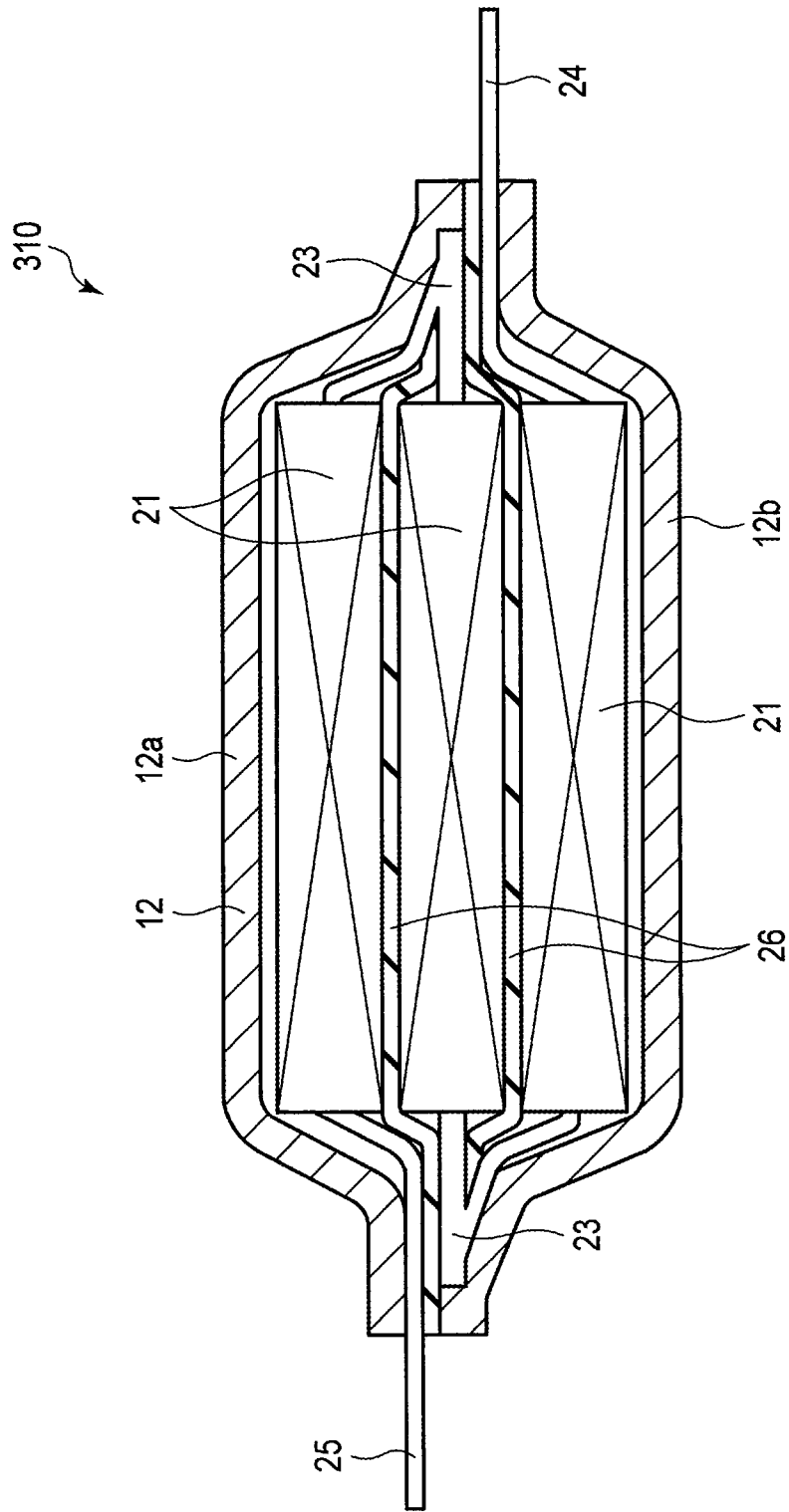
F I G. 7

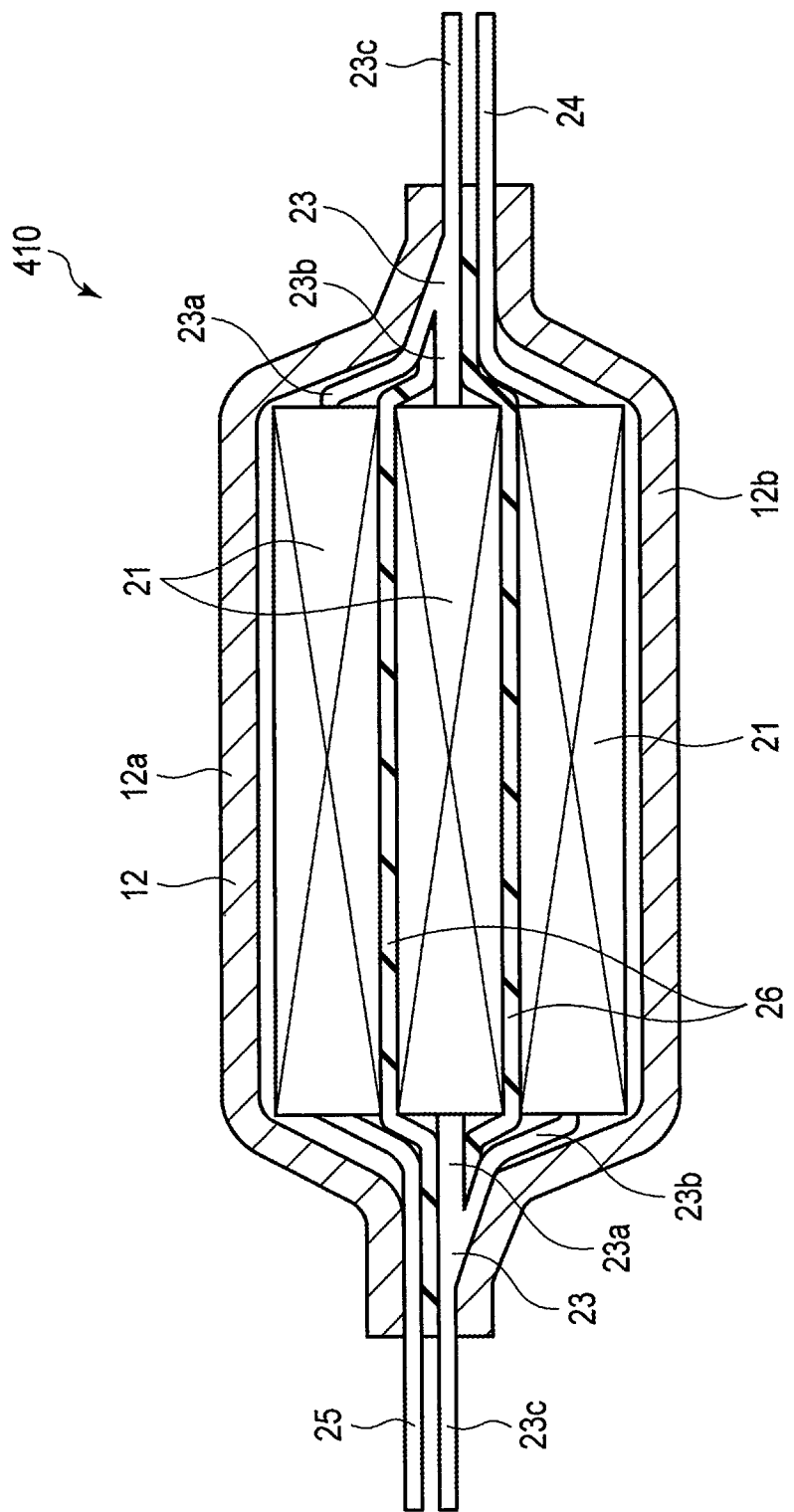
F I G. 8

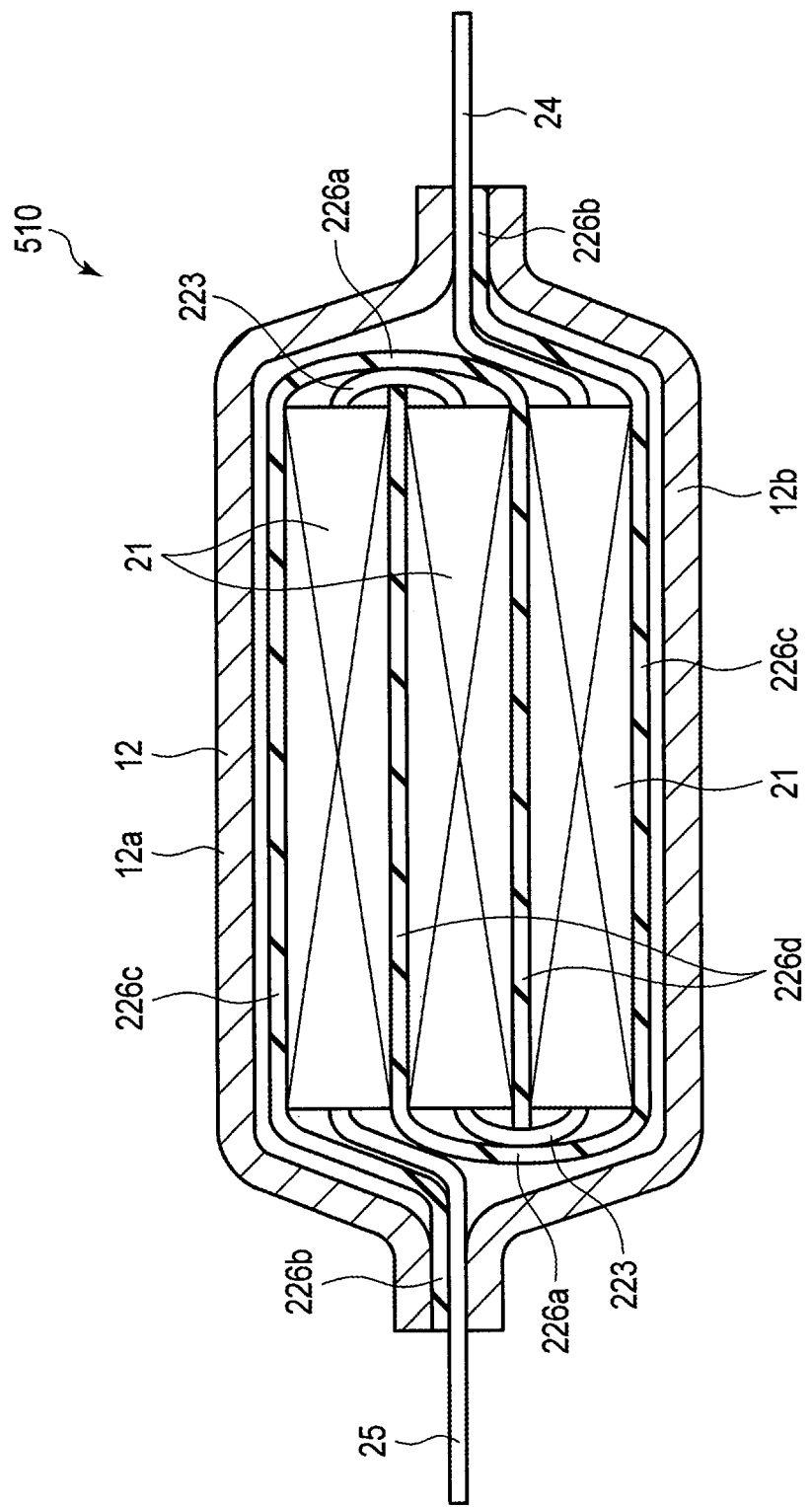
F I G. 9

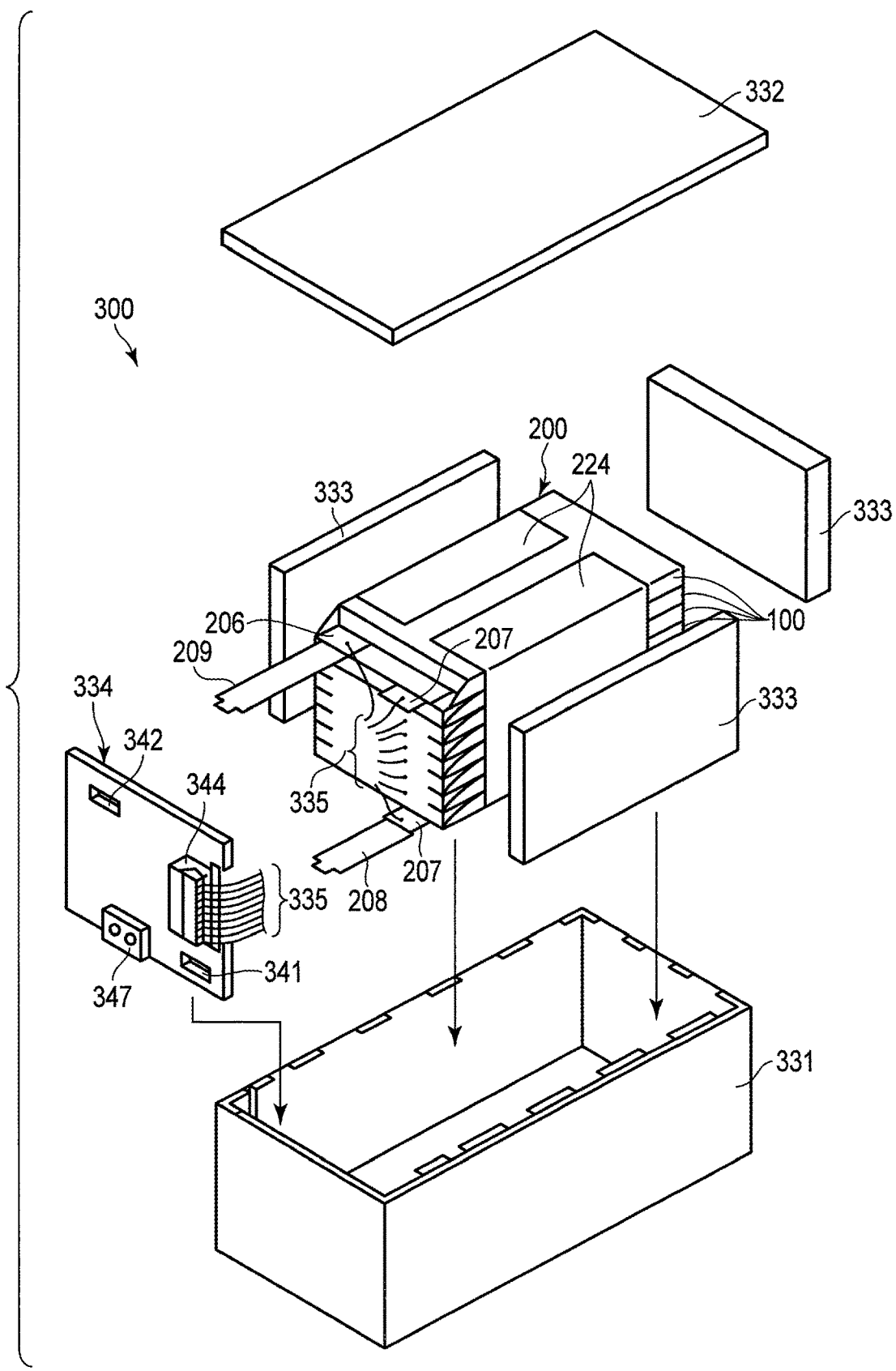
F I G. 12

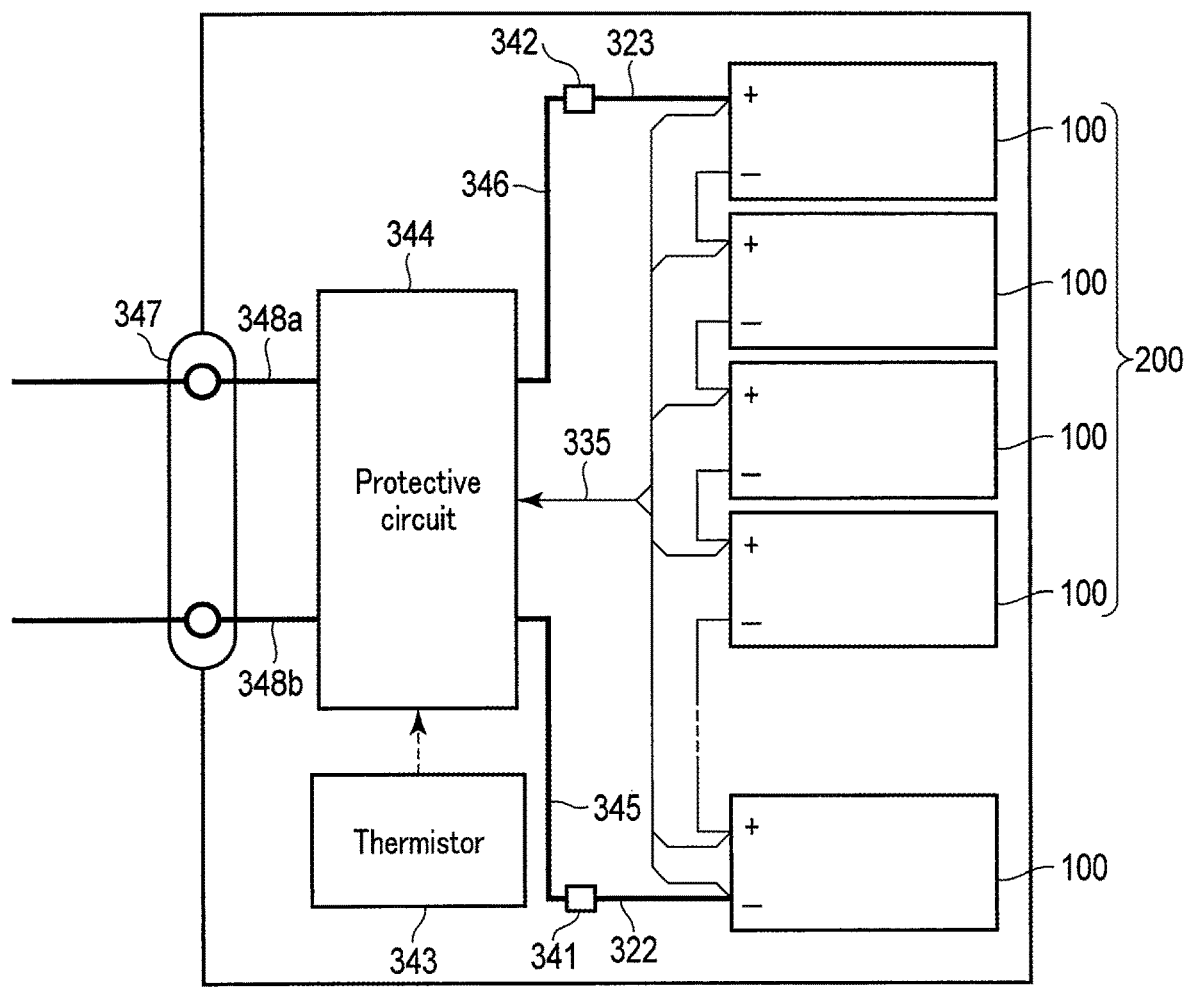
F I G. 13
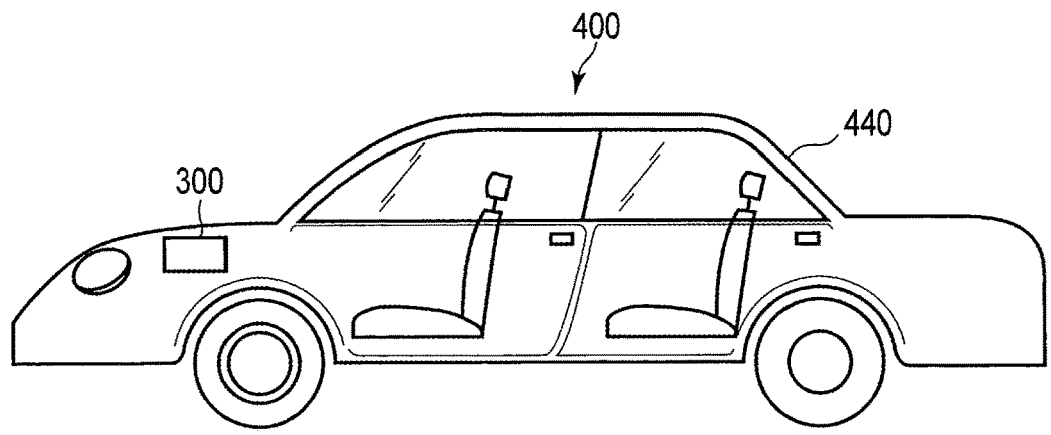
F I G. 14

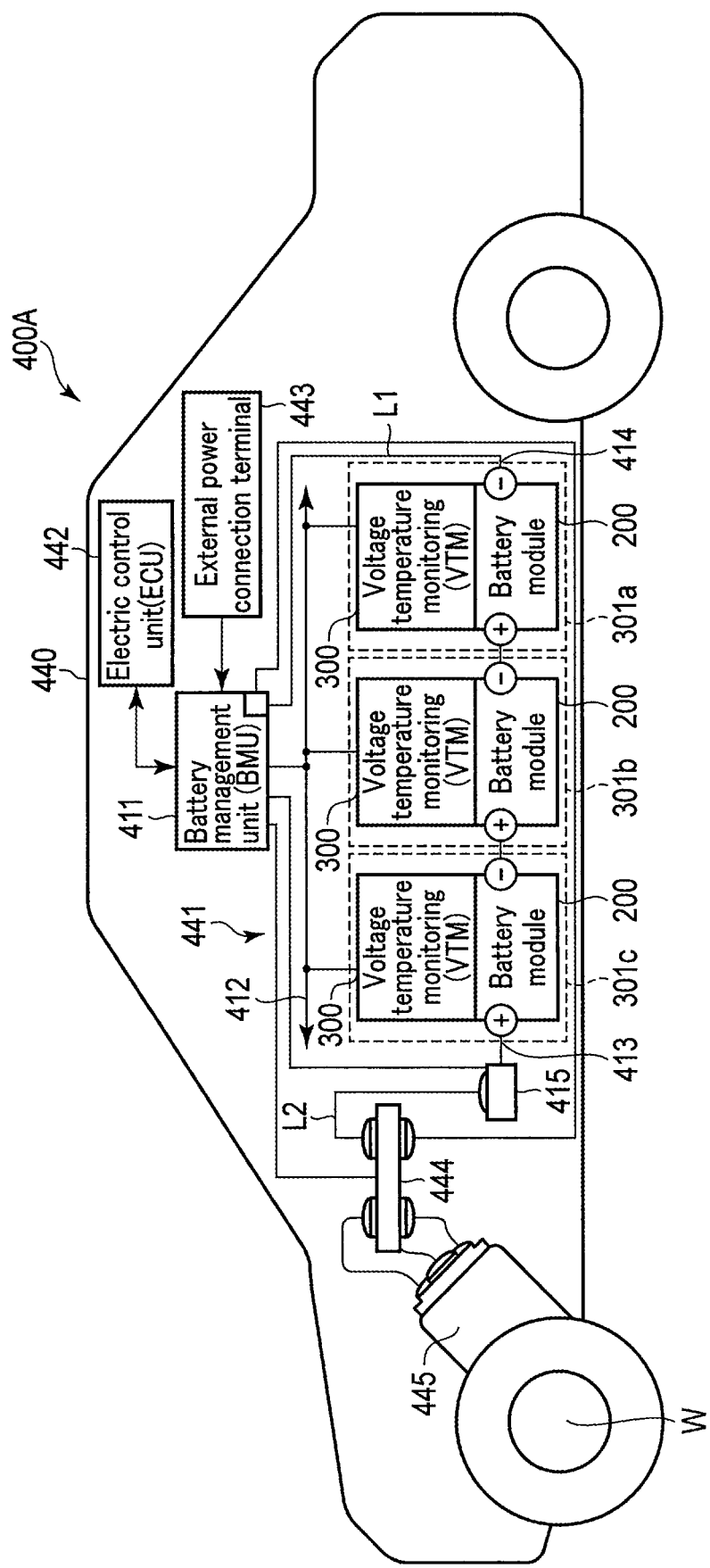
F I G. 15

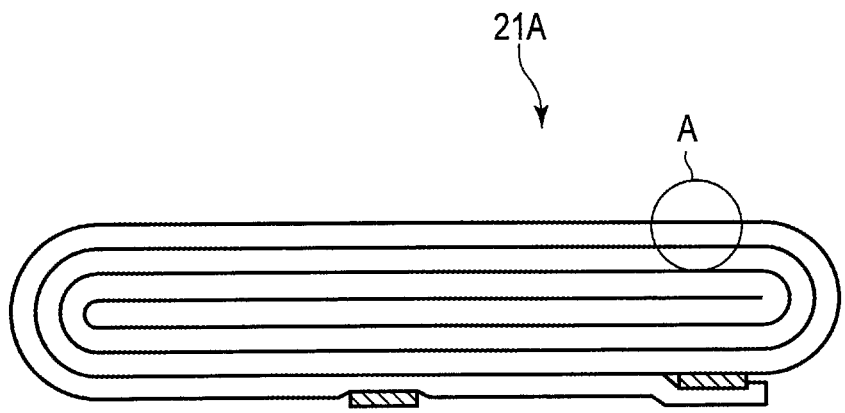
F I G. 16
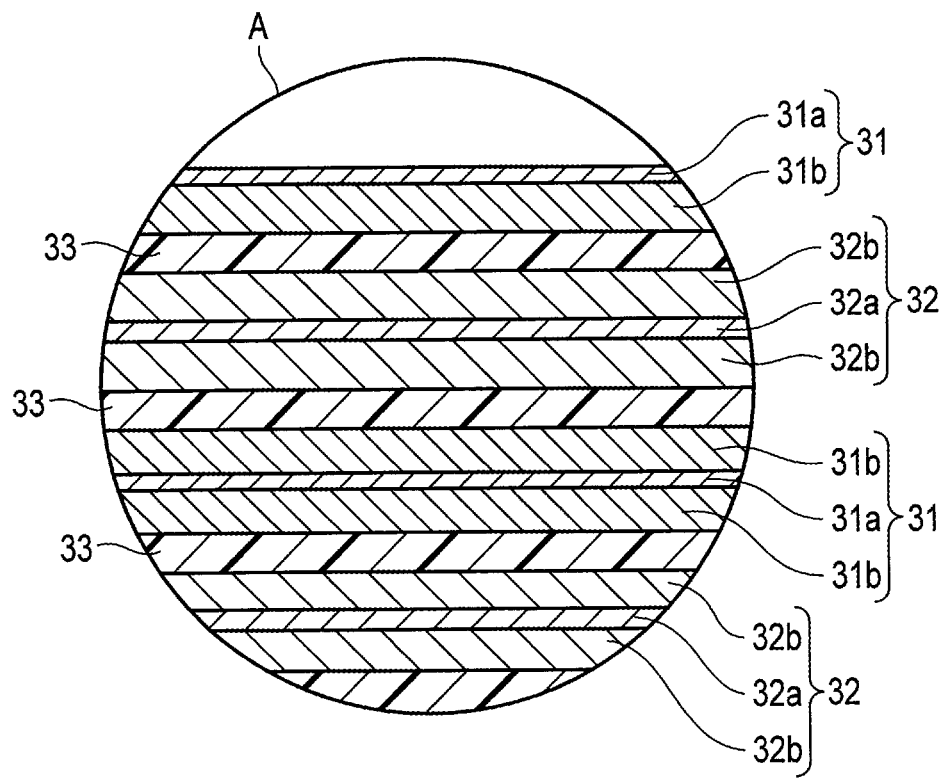
F I G. 17

SECONDARY BATTERY, BATTERY PACK, AND VEHICLE

CROSS-REFERENCE TO RELATED APPLICATIONS

This application is based upon and claims the benefit of priority from the prior Japanese Patent Application No. 2017-054656, filed Mar. 21, 2017 the entire contents of which are incorporated herein by reference.

FIELD

Embodiments described herein relate generally to a secondary battery, a battery pack, and a vehicle.

BACKGROUND

Secondary batteries such as a lithium ion secondary battery have been provided as high energy-density batteries. The secondary batteries are anticipated as power sources for hybrid automobiles, electric automobiles, uninterruptible power supplies for portable telephone base stations, and the like. However, even when the lithium ion secondary battery is increased in size, a voltage to be obtained from a unit cell is about 2.3 to 3.7 V. Therefore, unit cells need to be connected in series and controlled to obtain a high voltage, so that the whole device is increased in size.

One means of solving such a problem is a method which connects electrode groups in series inside a battery. In this case, a structure in which the electrode groups are independent is needed to prevent a short circuit attributed to ion conduction from being caused when electrolyte solutions present in the electrode groups contact each other.

For example, the use of a solid electrolyte containing no liquid electrolyte solution can reduce the possibility of a short circuit attributed to ion conduction between the electrode groups, but the ion conductivity of the solid electrolyte is generally $\frac{1}{10}$ to $\frac{1}{100}$ of that of the liquid electrolyte solution and lower, so that the output density of the battery is lower.

If a gel electrolyte which is a semisolid liquid electrolyte is used, it is expected that ion conductivity will be high and satisfactory output density of the battery will be obtained. However, the gel electrolyte more easily softens than the solid electrolyte, and has a problem of contact of gel electrolyte solutions between the electrode groups leading to a short circuit attributed to ion conduction.

BRIEF DESCRIPTION OF THE DRAWINGS

FIG. 5 is a sectional view showing the configuration of a secondary battery according to a third embodiment;

FIG. 7 is a sectional view showing the configuration of a secondary battery according to a fourth embodiment;

FIG. 8 is a sectional view showing the configuration of a secondary battery according to a fifth embodiment;

FIG. 9 is a sectional view showing the configuration of a secondary battery according to a sixth embodiment;

FIG. 12 is an exploded perspective view schematically showing one example of a battery pack according to a ninth embodiment;

FIG. 13 is a block diagram showing one example of an electric circuit of the battery pack;

FIG. 14 is a sectional view schematically showing one example of a vehicle according to a tenth embodiment;

FIG. 15 is a diagram schematically showing another example of a vehicle according to the tenth embodiment;

FIG. 16 is a side view showing the configuration of an electrode group according to an alternative embodiment; and FIG. 17 is a sectional view showing a part of FIG. 16 in enlarged form.

DETAILED DESCRIPTION

In one embodiment, a secondary battery includes, electrode groups, an insulating sheet, and a container member. The insulating sheet is disposed between the electrode groups. At least part of the insulating sheet is joined to the container member. The container member covers the outside of a stack having the electrode groups and the insulating sheet.

First Embodiment

Figure 1:
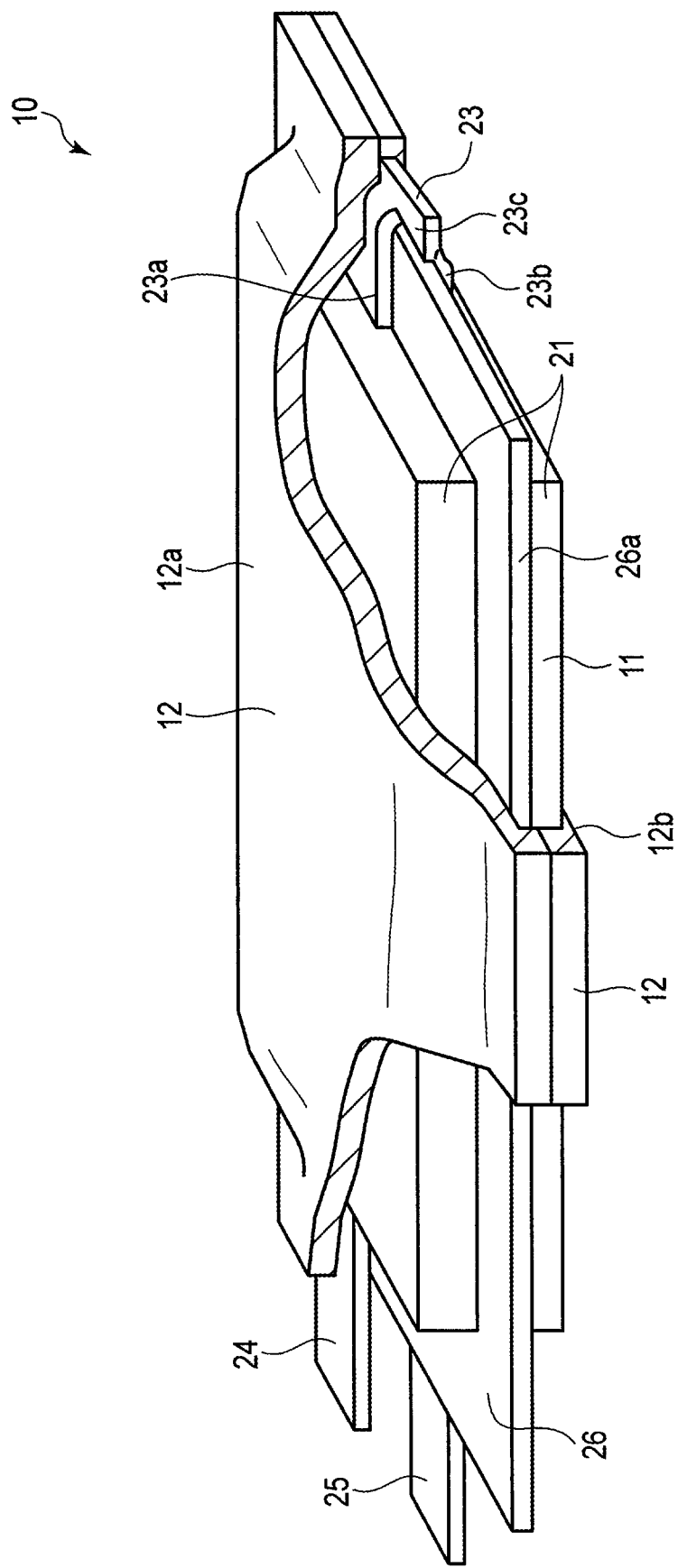
FIG. 1 is a partially cut-out perspective view showing the configuration of a secondary battery according to a first embodiment.
Figure 2:
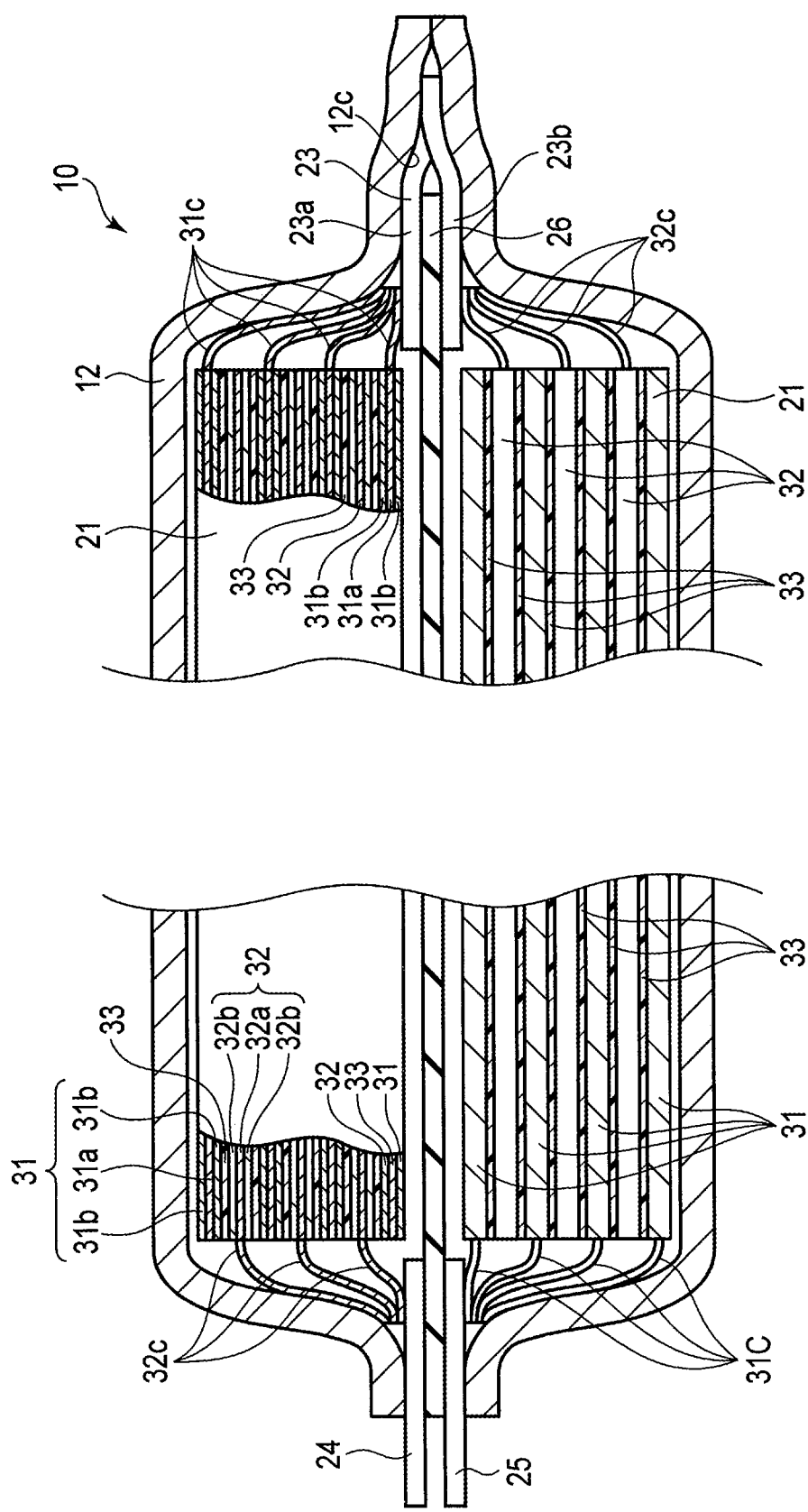
FIG. 2 is a sectional view showing the configuration of the secondary battery.
Figure 3:
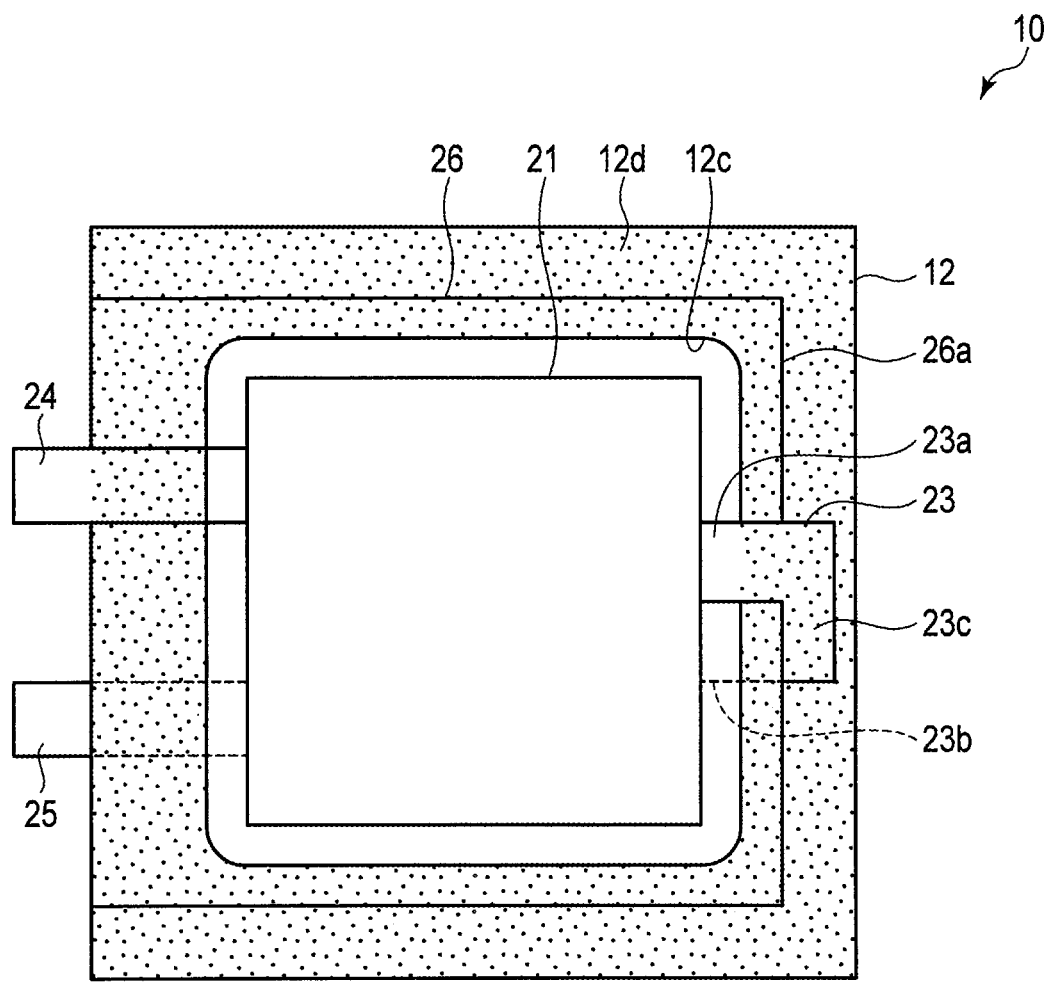
FIG. 3 is a plan view showing the configuration of the secondary battery.

A secondary battery according to a first embodiment is described below with reference to FIG. 1 to FIG. 3. Arrows X, Y, and Z in the drawings indicate three directions that are orthogonal to one another. Z is along the first direction, X is along the second direction, and Y is along the third direction. In each drawing, configurations are enlarged or reduced in size or omitted as needed for explanation. FIG. 1 is a perspective view of a secondary battery 10 according to the present embodiment, and shows an internal structure in which some components are cut out. FIG. 2 is a sectional view of the secondary battery 10. FIG. 3 is a plan view.

The secondary battery 10 shown in FIG. 1 to FIG. 3 comprises an electrode group stack 11, and a container member 12 which houses the electrode group stack 11. In the present embodiment, the secondary battery 10 is rectangularly configured, and has an electrode tab 24 of a negative electrode and an electrode tab 25 of a positive electrode that are led out from one end side of the container member 12 in the X-direction.

The electrode group stack 11 comprises electrode groups 21, 21, an electrolyte (not shown) with which the electrode groups 21, 21 are impregnated so that the electrolyte is held therein, a lead 23 which is an electrode group connector to electrically connect the electrode groups 21, 21, the electrode tabs 24 and 25 connected to the ends of the respective electrode groups 21, 21, and an insulating sheet 26 disposed between the electrode groups 21, 21 that are stacked and arranged. In the present embodiment, the two electrode groups 21, 21 that are connected in series by the lead 23 disposed on the other side in the X-direction are stacked in layers across the insulating sheet 26 in the Z-direction.

As shown in FIG. 2, each of the electrode groups 21, 21 comprises negative electrodes 31, positive electrodes 32, a separator 33 disposed between the negative electrode 31 and the positive electrode 32. In the present embodiment, four negative electrodes 31 and three positive electrodes 32 are alternately stacked in the Z-direction by way of example. A pair of electrode groups 21, 21 are configured in the same manner, but are disposed so that their electrodes are arranged in reverse directions. Specifically, in one top electrode group 21, a connection piece 32c of the positive electrode extends toward one side in the X-direction and is thus connected to the electrode tab 25, and a connection piece 31c of the negative electrode extends toward the other side and is thus connected to the lead 23. In the other bottom electrode group 21, the connection piece 31c of the negative electrode extends toward one side in the X-direction and is thus connected to the electrode tab 24, and the connection piece 32c of the positive electrode extends toward the other side and is thus connected to the lead 23.

The negative electrode 31 comprises a current collector 31a, and negative electrode layers 31b formed on one surface or both surfaces of the current collector 31a. The negative electrode layers 31b include an active material, a conductive agent, and a binder.

The current collector 31a is made of, for example, rectangularly molded metallic foil, and is disposed along an XY plane orthogonal to the Z-direction which is a stacking direction. The current collector 31a is preferably, for example, copper foil, aluminum foil, or aluminum alloy foil including elements such as Mg, Ti, Zn, Mn, Fe, Cu, and Si.

In the electrode group stack 11, each of the current collectors 31a of the negative electrodes 31 integrally has the connection piece 31c at its end. In one electrode group 21, the connection pieces 31c respectively provided in the current collectors 31a are disposed on the other side in the X-direction, and connected to a negative electrode piece 23a of the lead 23. In the other electrode group 21, the connection pieces 31c respectively provided in the current collectors 31a are disposed on one side in the X-direction, and connected to the electrode tab 24 of the negative electrode.

Examples of negative electrode active material particles that can have lithium ions inserted and extracted may include a carbon material, a graphite material, a lithium alloy material, a metal oxide, and a metal sulfide. Among them, it is preferred to select negative electrode active material particles of at least one or more kinds of titanium-containing oxides selected from lithium-titanium oxide, titanium oxide, niobium-titanium oxide, and lithium-sodium-niobium-titanium oxide which have a potential of having lithium ions inserted and extracted within a range of 1 V to 3 V based on an Li potential.

The titanium-containing oxide may include a spinel structure lithium-titanium oxide represented by General Formula $Li_{4+x}Ti_5O_{12}$ ($-1 \leq x \leq 3$), a sodium-containing orthorhombic titanium oxide represented by General Formula $Li_{2+a}M(I)_{2-b}Ti_{6-c}M(II)_dO_{14+\sigma}$ ($0 \leq a \leq 6$, $0<b<2$, $0<c<6$, $0<d<6$, $-0.5 \leq \delta \leq 0.5$) (M(I) is one kind of element or two or more kinds of elements selected from the group consisting of Sr, Ba, Ca, Mg, Na, Cs, and K, and M(II) is one kind of element or two or more kinds of elements selected from the group consisting of Zr, Sn, V, Nb, Ta, Mo, W, Fe, Co, Mn, Al, and Y), a lithium-titanium oxide as a ramsdellite structure lithium-titanium oxide such as $Li_{2+x}Ti_3O_7$, $Li_{1+x}Ti_2O_4$, $Li_{1.1+x}Ti_{1.8}O_4$, $L_{1.07+x}Ti_{1.86}O_4$, and $Li_xTiO_2$ ($0 \leq x$), titanium oxide having a monoclinic structure ($TiO_2(B)$ as a structure before charging), titanium oxide having a rutile structure ($TiO_2$ as a structure before charging), or titanium oxide having an anatase structure ($TiO_2$ as a structure before charging) represented by General Formula $Li_xTiO_2$ ($0 \leq x$), and niobium-titanium oxide represented by $Li_aTiM_bNb_{2-\beta}O_{7\pm\sigma}$ ($0<a<5$, $0<b<0.3$, $0<\beta<0.3$, $0<\sigma<0.3$, M includes at least one or more kinds of elements selected from the group consisting of Fe, V, Mo, and Ta). One of the above may be used alone, or the above may be mixed.

The conductive agent increases current collection performance of the active material, and suppresses the resistance of contact with the current collector 31a. Examples of the conductive agent may include acetylene black, carbon black, and graphite.

The binder can bind the active material to the conductive agent. Examples of the binder may include polytetrafluoroethylene (PTFE), polyvinylidene fluoride (PVdF), fluorine-based rubber, and styrene butadiene rubber.

The active material, conductive agent and binder in the negative electrode layer 31b are preferably blended in proportions of 70% by mass to 96% by mass, 2% by mass to 28% by mass, and 2% by mass to 28% by mass, respectively. When the amount of conductive agent is 2% by mass or more, the current collection performance of the negative electrode layer 31b can be improved, and the high-current characteristics of the secondary battery 10 can be improved. When the amount of binder is 2% by mass or more, binding performance between the negative electrode layer 31b and the current collector 31a can be enhanced, and cycling performances can be improved. On the other hand, an amount of each of the conductive agent and binder is preferably 28% by mass or less, in view of increasing the capacity.

The negative electrode 31 is produced, for example, by the suspension of the active material, the conductive agent, and the binder in a general-purpose solvent to prepare slurry, the application of this slurry to the current collector 31a, drying, and the following pressing.

The positive electrode 32 comprises a current collector 32a, and positive electrode layers 32b which are formed on one surface or both surfaces of the current collector 32a and which include an active material, a conductive agent, and a binder.

The current collector 32a is, for example, rectangularly molded metallic foil, and is provided along an XY plane orthogonal to the Z-direction which is the stacking direction. The current collector 32a is preferably, for example, aluminum foil, or aluminum alloy foil including one kind of element or two or more kinds of elements selected from the group consisting of Mg, Ti, Zn, Mn, Fe, Cu, and Si.

In the electrode group stack 11, the current collectors 32a of the positive electrodes 32 integrally comprises the connection pieces 32c extending toward one end side in the X-direction, respectively. In one top electrode group 21, the connection pieces 32c respectively provided in the current collectors 32a are disposed at the other end in the X-direction, and connected to a positive electrode piece 23b of the lead 23. In the other bottom electrode group 21, the connection pieces 32c respectively provided in the current collectors 32a are disposed at one end in the X-direction, and connected to the positive electrode tab 25.

Examples of the positive electrode active material may include an oxide, a polymer, etc.

Examples of the oxide include oxides which have Li inserted and extracted: manganese dioxide ($MnO_2$), iron oxide, copper oxide, nickel oxide, lithium manganese composite oxide (e.g., $Li_xMn_2O_4$ or $Li_xMnO_2$), lithium nickel composite oxide (e.g., $Li_xNiO_2$), lithium cobalt composite oxide ($Li_xCoO_2$), lithium nickel cobalt composite oxide (e.g., $LiNi_{1-y}Co_yO_2$), lithium manganese cobalt composite oxide (e.g., $LiMn_yCo_{1-y}O_2$), spinel type lithium manganese nickel composite oxide ($Li_xMn_{2-y}Ni_yO_4$), lithium phosphorus oxide having an olivine structure (e.g., $Li_xFePO_4$, $Li_xFe_{1-y}Mn_yPO_4$, and $Li_xCoPO_4$), iron sulfate $[Fe_2(SO_4)_3]$, and vanadium oxide (e.g., $V_2O_5$).

Examples of the polymer include conductive polymer materials such as polyaniline and polypyrrole, and disulfide-based polymer materials. In addition, sulfur (S), carbon fluoride can also be used.

Examples of the preferred positive electrode active material include lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($Li_xNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$), and lithium iron phosphate ($Li_xFePO_4$), which have a high positive electrode voltage. (x and y preferably range from 0 to 1).

The conductive agent increases current collection performance of the active material, and suppresses the resistance of contact with the current collector. Examples of the conductive agent may include carbonaceous substances such as acetylene black, carbon black, and graphite.

The binder binds the active material to the conductive agent. Examples of the binder may include polytetrafluoroethylene (PTFE), polyvinylidene fluoride (PVdF), and fluorine-based rubber.

The active material, conductive agent and binder in the positive electrode layer 32b are preferably blended in proportions of 80% by mass to 95% by mass, 3% by mass to 18% by mass, and 2% by mass to 17% by mass, respectively. When the amount of conductive agent is 3% by mass or more, advantageous effects described above can be provided. When the amount of conductive agent is 18% by mass or less, the decomposition of the electrolyte on the surface of the conductive agent during high-temperature storage can be reduced. When the amount of binder is 2% by mass or more, sufficient positive electrode strength can be obtained. When the amount of binder is 17% by mass or less, the blend amount of the binder which is an insulating material in the positive electrode can be reduced, and thereby the internal resistance can be decreased.

The positive electrode 32 is produced, for example, by the suspension of the active material, the conductive agent, and the binder in a general-purpose solvent to prepare slurry, the application of this slurry to the current collector 32a, drying, and the following pressing. The positive electrode 32 may also be produced by forming an active material, a conductive agent, and a binder into pellets as the positive electrode layer 32b, and forming the positive electrode layer 32b on the current collector 32a.

The separator 33 is formed into a rectangular sheet shape. As the separator 33, for example, a porous film or synthetic resin nonwoven fabric including polyethylene, polypropylene, cellulose, or polyvinylidene fluoride (PVdF) is used. A preferable porous film is formed from polyethylene or polypropylene, melts at a fixed temperature, can shut off a current, and can therefore improve safety. Alternatively, insulating particles may be formed on one surface or both surfaces of the positive electrode and/or the negative electrode as the separator 33. The insulating particles include metal oxides. Moreover, the use of a solid electrolyte as insulating particles can reduce the resistance of the secondary battery.

It is possible to use, as the electrolyte, for example, a liquid nonaqueous electrolyte which is prepared by dissolving electrolyte salt in an organic solvent, or gel like nonaqueous electrolyte which is a composite of a liquid electrolyte and a polymer material.

The liquid nonaqueous electrolyte is preferably electrolyte salt dissolved in an organic solvent at a concentration of 0.5 M to 2.5 M.

Examples of the electrolyte salt may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide $[LiN(CF_3SO_2)_2]$, and mixtures thereof. The electrolyte salt is preferably resistant to oxidation even at a high potential, and most preferably $LiPF_6$.

Examples of the organic solvent include a cyclic carbonate such as propylene carbonate (PC), ethylene carbonate (EC), or vinylene carbonate; a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

A preferable organic solvent is a mixed solvent in which at least two or more of a group consisting of propylene carbonate (PC), ethylene carbonate (EC), and diethyl carbonate (DEC) are mixed, or a mixed solvent including γ-butyrolactone (GBL). By using these mixed solvents, a nonaqueous electrolyte secondary battery with excellent high-temperature characteristics can be obtained.

The electrode groups 21 and 21 are connected by the lead 23. Specially, the negative electrodes of one electrode group 21 are connected in series to the positive electrodes of the other electrode group 21 by the lead 23.

The lead 23 is made of, for example, aluminum foil. The lead 23 has a rectangular sheet shape, and comprises the negative electrode piece 23a and the positive electrode piece 23b formed on one side, a common piece 23c which integrally couples the other end sides of the negative electrode piece 23a and the positive electrode piece 23b. The lead 23 has a slit 23d formed from one edge to a middle part, and has a part on one side branching into the negative electrode piece 23a and the positive electrode piece 23b. The lead 23 is connected to the edges of the electrode groups 21, 21 on the other end side in the X-direction. The lead 23 connects a pair of electrode groups 21, 21 in series by the connection of the negative electrode piece 23a to the connection pieces 31c of the negative electrodes 31 of the top electrode group 21 and the connection of the positive electrode piece 23b to the connection pieces 32c of the positive electrodes 32 of the bottom electrode group 21.

It is preferable to use 100% pure aluminum foil or aluminum alloy foil having a purity of 98% or more as the lead 23. As the aluminum alloy, an alloy including one or more kinds of elements selected from the group consisting of iron, magnesium, zinc, manganese, and silicon in addition to aluminum is preferred. For example, an Al—Fe alloy, an Al—Mn-based alloy, and an Al—Mg-based alloy are able to obtain higher strength than that of aluminum. On the other hand, a content of aluminum and transition metals such as nickel, chromium, etc., in the aluminum alloy is preferably 100 ppm or less (including 0 ppm). For example, the Al—Cu-based alloy has increased strength, but deteriorated corrosion resistance, and thus, the Al—Cu-based alloy is not suitable as the lead. A still preferable aluminum purity is in a range of 99.95% to 98.0%. The thickness of this lead is preferably 20 µm or more. An excessively great thickness leads to deterioration in handling efficiency or deterioration in capacity per unit volume, and the thickness is therefore preferably 1 mm or less, still preferably 500 µm or less, and yet preferably 200 µm or less.

The insulating sheet 26 is an electrically and ion-conductively insulating sheet, and, for example, polypropylene (PP), polyethylene (PE), nylon, or polyethylene terephthalate (PET) can be used as the insulating sheet 26. When the insulating sheet 26 is fusion-bonded to the container member 12, it is preferable to use a material having a thermal fusion bond temperature close to those of the insulating sheet 26 and a resin part of the container member 12. For example inner surfaces of laminate films 12a and 12b and the insulating sheet may be made of the same material.

The insulating sheet 26 is a rectangular sheet larger in area than the surfaces of the electrode groups 21, 21 facing each other, and an outer peripheral edge of the insulating sheet 26 is joined to the container member 12. That is, an outer peripheral edge 26a of the insulating sheet 26 protrudes outward more than the outer peripheral edges of the electrode groups 21, 21 in an XY plane. The insulating sheet 26 forms, between the stacked electrode groups 21, 21, a partition which divides the internal space of the container member 12 into one side and the other side in the Z-direction. One end of the insulating sheet 26 is inserted in the slit 23d of the lead 23, and is disposed between the negative electrode piece 23a and the positive electrode piece 23b. The other end of the insulating sheet 26 is disposed between the electrode tab 24 of the negative electrode and the electrode tab 25 of the positive electrode.

The outer peripheral edge 26a of the insulating sheet 26 is joined to and clamped by the container member 12. In the present embodiment, by way of example, as shown in FIG. 3, the whole outer peripheral edge 26a of the insulating sheet 26 is clamped between a pair of laminate films 12a and 12b of the container member 12, and joined by, for example, welding. FIG. 3 is a plan view in which the laminate film 12a is omitted, and a welded part 12c of the laminate films 12a and 12b is indicated by stipple. The outer peripheral edge 26a of the insulating sheet 26 is welded together to the welded part 12c indicated by stipple in FIG. 3. Therefore, the internal space of the container member 12 is liquid-tightly split by the insulating sheet 26.

The container member 12 has the pair of laminate films 12a and 12b that clamp the electrode group stack 11 in between, and covers the surface of the electrode group stack 11. In the present embodiment, the pair of rectangular laminate films 12a and 12b are disposed on one side and the other of the stack, and the outer peripheries of the pair of rectangular laminate films 12a and 12b are joined together.

The laminate films 12a and 12b clamp the outer peripheral edge of the insulating sheet 26 in between.

For example, multilayer films in which a metallic layer intervenes between resin layers are used as the laminate films 12a and 12b. The metallic layer is preferably aluminum foil or aluminum alloy foil for weight reduction. A polymeric material such as polypropylene (PP), polyethylene (PE), nylon, or polyethylene terephthalate (PET) can be used in the resin layers.

The laminate films 12a and 12b can be sealed by, for example, thermal fusion bonding and thereby molded as the container member 12.

A container made of some other material such as a metallic container instead of the laminate films 12a and 12b can be used as the container member 12. For example, the metallic container is formed into a box shape having a thickness of 1.0 mm or less. The metallic container preferably has a thickness of 0.5 mm or less. For example, the metallic container is made of aluminum or aluminum alloy. As the aluminum alloy, an alloy including one kind of element or two or more kinds of elements selected from the group consisting of magnesium, zinc, or silicon is preferred. When the alloy includes a transition metal such as iron, copper, nickel, or chromium, its amount is preferably 100 mass ppm or less. When the metallic container is used, for example, the insulating sheet 26 is joined to the metallic container by thermal welding, laser welding, or caulking.

The container member 12 can be formed into, for example, a flat shape (thin shape), a circular cylindrical shape, a coin shape, and a button shape in addition to a square shape.

The container member 12 includes, for example, a small battery container member mounted on a portable electronic device or the like, and a large battery container member mounted on a two-wheeled or four-wheeled vehicle, a railway vehicle, or the like, in accordance with battery dimensions.

The secondary battery 10 having the configuration described above comprises the electrode groups 21, 21 disposed in layers in the predetermined stacking direction, the insulating sheet 26 disposed between the electrode groups 21, 21 in the stacking direction, and the container member 12 which covers the outside of the stack having the electrode groups 21, 21 and the insulating sheet 26. That is, because the electrode groups 21 are isolated from each other by the insulating sheet 26, a short circuit attributed to ion conduction caused by the contact between the electrolytes of the electrode groups 21, 21 can be inhibited. The insulating sheet 26 is joined to the container member 12 all around the periphery, and the spaces in the container member 12 can thus be liquid-tightly isolated from each other, so that it is possible to prevent even liquid electrolyte from entering the other region beyond the insulating sheet 26, and therefore possible to certainly prevent a short circuit regardless of the form of the electrolyte. Moreover, one container member 12 comprises the electrode groups 21, 21 that are connected in series, so that the number of components and manufacturing costs can be lower than when more than one container member are used.

According to the secondary battery 10, the whole outer periphery of the insulating sheet 26 is joined to the container member 12, so that the space in the container member 12 can be liquid-tightly split, and a short circuit can be effectively prevented even if the electrolyte is liquid.

According to the first embodiment, the insulating sheet disposed between the electrode groups is provided, and at least part of the insulating sheet is connected to the container member, whereby a short circuit attributed to ion conduction caused by the contact between the electrolytes of the electrode groups can be inhibited.

Second Embodiment

Figure 4:
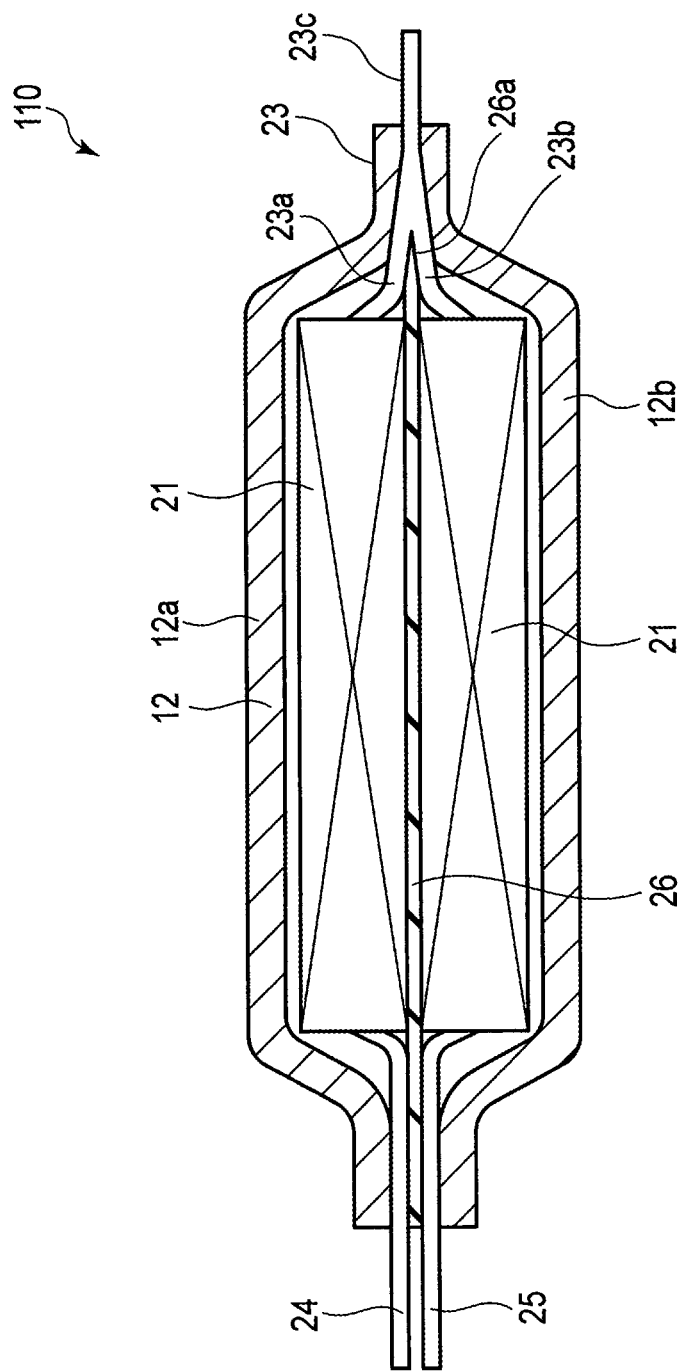
FIG. 4 is a sectional view showing the configuration of a secondary battery according to a second embodiment.

A secondary battery 110 according to a second embodiment is described with reference to FIG. 4. The secondary battery 110 according to the second embodiment is configured so that part of the lead 23 is led to the outside of the container member 12. The secondary battery 110 is similar in other respects to the secondary battery 10 according to the first embodiment. The same configurations in the present embodiment as those in the previously described first embodiment are not repeatedly described.

In the secondary battery 110, the lead 23 which connects the electrode groups 21, 21 in series has a rectangular sheet shape, and comprises a negative electrode piece 23a and a positive electrode piece 23b formed on one side, a common piece 23c which integrally couples the other end sides of the negative electrode piece 23a and the positive electrode piece 23b, as in the first embodiment. The lead 23 has a slit 23d formed from one edge to a middle part, and has a part on one side branching into the negative electrode piece 23a and the positive electrode piece 23b. The lead 23 is connected to the edges of the electrode groups 21, 21 on the other end side in the X-direction, and the negative electrode piece 23a is connected to the connection pieces 31c of the negative electrodes 31 of the top electrode group 21. A pair of electrode groups 21, 21 are connected in series by the connection of the positive electrode piece 23b to the connection pieces 32c of the positive electrodes 32 of the bottom electrode group 21.

The common piece 23c of the lead 23 is clamped by a pair of laminate films 12a and 12b of the container member 12, and has a predetermined length to reach the outside of the container member 12. That is, the lead 23 is led to the outside of the container member 12 from the ends of the electrode groups 21, 21 through the space between the laminate films 12a and 12b.

The whole outer peripheral part of the insulating sheet 26 is clamped by a pair of laminate films 12a and 12b of the container member 12, and welded to the container member 12.

Advantageous effects similar to those in the previously described first embodiment are obtained in the present embodiment as well. That is, the space in the container member 12 is split by the insulating sheet 26, and the contact between the electrolytes of the electrode groups 21, 21 is prevented, so that a short circuit can be prevented. Moreover, the insulating sheet 26 is joined to the container member 12 all around the periphery, and the spaces in the container member 12 can thus be liquid-tightly isolated from each other, so that it is possible to prevent even liquid electrolyte from entering the other region beyond the insulating sheet 26, and therefore possible to certainly prevent a short circuit regardless of the form of the electrolyte.

Furthermore, according to the secondary battery 110, the lead 23 is exposed to the outside, and an external terminal can thus be electrically connected to the lead 23. Therefore, the voltage of each of the electrode groups 21, 21 in the battery 110 can be independently monitored, leading to satisfactory maintenability.

According to the second embodiment, the insulating sheet disposed between the electrode groups is provided, and at least part of the insulating sheet is joined to the container member, whereby a short circuit attributed to ion conduction caused by the contact between the electrolytes of the electrode groups can be inhibited. Moreover, according to the second embodiment, at least part of the lead is led to the outside of the container member, and the voltage can thus be independently monitored.

Third Embodiment

Figure 6:
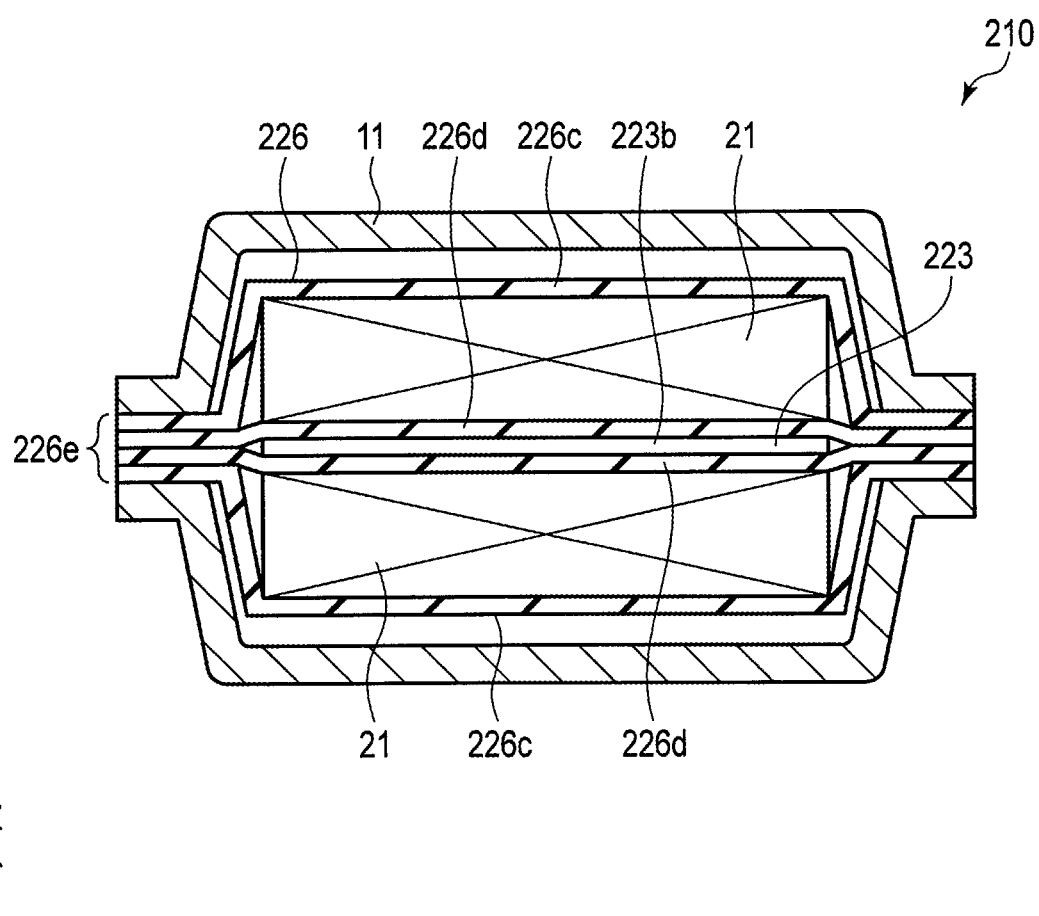
FIG. 6 is a sectional view showing the configuration of the secondary battery.

A secondary battery 210 according to a third embodiment is described with reference to FIG. 5 and FIG. 6. FIG. 5 is a sectional view of the secondary battery 210 along an XZ plane. FIG. 6 is a sectional view along a YZ plane. The secondary battery 210 according to the third embodiment has a pair of electrode groups 21, 21 which are arranged so that electrodes are aligned in the same direction, and comprises a strip-shaped lead 223 extending to one end side after folded from the other end side in the X-direction. The secondary battery 210 comprises insulating sheets 226. The secondary battery 210 is similar in other respects to the secondary battery 10 according to the first embodiment. The same configurations in the present embodiment as those in the previously described first embodiment are not repeatedly described.

In the secondary battery 210 shown in FIG. 5 and FIG. 6, a pair of electrode groups 21, 21 are arranged in layers in the same direction. The electrode groups 21, 21 have connection pieces 32c of positive electrodes led to one side, and connection pieces 31c of negative electrodes led to the other side.

The lead 223 which connects the electrode groups 21, 21 in series is formed into a strip shape having about the same Y-direction dimension as the electrode group 21. The lead 223 has one end 223a connected to the negative-electrode-side connection piece 31c of the top electrode group 21 and folded back downward on the other end side in the X-direction, has a middle part 223b extending to one side in the X-direction through the space between the pair of electrode groups 21, 21, and has the other end 223c folded back and then connected to the positive-electrode-side connection piece 32c of the bottom electrode group 21. That is, the lead 223 intervenes between the surfaces of the pair of electrode groups 21, 21 facing each other.

A pair of insulating sheets 226 are strip-shaped. The width dimension of the insulating sheet 226 in the Y-direction is formed to be smaller than the width dimension of the container member 12 and larger than the width dimension of the electrode group 21. The insulating sheet 226 is folded back in a fold-back portion 226a disposed between the container member 12 and the end of the electrode group 21, and covers both sides of the electrode group 21 in the Z-direction. The fold-back portion 226a is disposed outside a fold-back portion of the lead 223 at the end of the electrode group 21 in the X-direction. The insulating sheet 226 covers the surfaces of the electrode group 21 on both sides in the Z-direction with sheet-shaped portions 226c and 226d on one side and the other of the fold-back portion 226a.

One top insulating sheet 226 has one end 226b in a longitudinal direction welded to the container member 12 together with an electrode tab 25 of the positive electrode on one side in the X-direction, has the sheet-shaped portion 226c on one end side extending to the other side in the X-direction through the space between the top electrode group 21 and the container member 12 and folded back downward in the fold-back portion 226a, and has the sheet-shaped portion 226d on the other end side returning to one side in the X-direction through the space between the bottom electrode group 21 and the middle part 223b of the lead 223 and reaching a fold-back portion of the other end 223c of the lead 223.

The other bottom insulating sheet 226 has one end 226b in the longitudinal direction welded to the container member 12 together with an electrode tab 24 of the negative electrode on the other side in the X-direction, has the sheet-shaped portion 226c on one end side extending to one side in the X-direction through the space between the bottom electrode group 21 and the container member 12 and folded back upward in the fold-back portion 226a, and has the sheet-shaped portion 226d on the other end side returning to the other side in the X-direction through the space between the top electrode group 21 and the middle part 223b of the lead 223 and reaching a fold-back portion of one end 223a of the lead 223.

In the secondary battery 210, the insulating sheets 226 insulate the top electrode group 21 and the lead 223 from each other, and insulate the bottom electrode group 21 and the lead 223 from each other.

The pair of insulating sheets 226 have one end 226b and both edges in the Y-direction clamped between and then welded to a pair of laminate films 12a and 12b of the container member 12, and are thereby joined to the container member 12.

Advantageous effects similar to those in the previously described first embodiment are obtained in the secondary battery 210 according to the present embodiment as well. That is, the space in the container member 12 is split by the insulating sheets 226, and the contact between the electrolytes of the electrode groups 21, 21 is prevented, so that a short circuit can be prevented.

According to the third embodiment, the insulating sheet disposed between the electrode groups is provided, and at least parts of the insulating sheets are joined to the container member, whereby a short circuit attributed to ion conduction caused by the contact between the electrolytes of the electrode groups can be inhibited.

Fourth Embodiment

A secondary battery 310 according to a fourth embodiment is described with reference to FIG. 7. The secondary battery 310 according to the fourth embodiment comprises three electrode groups 21, and has a configuration in which an insulating sheet 26 intervenes between each pair of electrode groups adjacent in the Z-direction. The secondary battery 310 is similar in other respects to the secondary battery 10 according to the first embodiment. The same configurations in the present embodiment as those in the previously described first embodiment are not repeatedly described.

In the secondary battery 310, of the three electrode groups 21, 21, 21, the electrode group 21 disposed in the middle in the Z-direction lies so that positive and negative connection pieces 31c and 32a are aligned in directions to be located opposite in the X-direction to those of the two electrode groups 21, 21 on both sides and connected in series. Specifically, the top and bottom electrode groups 21, 21 have the connection pieces 32c of positive electrodes led to one side, and the connection pieces 31c of negative electrodes led to the other side, in the X-direction.

The middle electrode group 21 has the connection pieces 32c of the positive electrodes led to the other side, and the connection pieces 31c of the negative electrodes led to one side, in the X-direction. A positive electrode tab 25 is connected to the connection pieces 32c of the positive electrodes of the electrode group 21 disposed on the top. A negative electrode tab 24 of the negative electrode is connected to the connection pieces 31c of the negative electrodes of the electrode group 21 disposed on the bottom. The connection pieces 32c of the positive electrodes of the middle electrode group 21 are connected to the connection pieces 31c of the negative electrodes of the top electrode group 21 by the lead 23, and the connection pieces 32c of the positive electrodes of the bottom electrode group 21 are connected to the connection pieces 31c of the negative electrodes of the middle electrode group 21 by the lead 23. The electrode tabs 24 and 25 extend to the outside of the container member 12.

The pair of insulating sheets 26 respectively extend to the opposite sides in the X-direction from the spaces between the electrode tabs 24 and 25 and the lead 23 through the spaces between the pairs of electrode groups 21, 21, and are inserted into the spaces between the negative electrode pieces 23a and the positive electrode pieces 23b at the opposite ends of the lead 23.

The pair of insulating sheets 26 have the whole outer peripheral edge 26a clamped between and then welded to a pair of laminate films 12a and 12b.

Therefore, in the secondary battery 310, the pair of insulating sheets 26 not only isolate the three layers of electrode groups 21, 21, 21 but also isolate each lead 23 from the electrode tab 24, and the lead 23 from the electrode tab 25. The inside of the container member 12 is liquid-tightly split into three parts in the Z-direction by the pair of top and bottom insulating sheets 26.

Advantageous effects similar to those in the previously described first embodiment are obtained in the secondary battery 310 according to the present embodiment as well. That is, the space in the container member 12 is split into three parts by the insulating sheets 26, and the contact between the electrolytes of the electrode groups 21, 21, 21 is prevented, so that a short circuit can be prevented. Moreover, the insulating sheets 26 are joined to the container member 12 all around the periphery, and the spaces in the container member 12 can thus be liquid-tightly isolated from each other, so that it is possible to prevent even liquid electrolyte from entering the other region beyond the insulating sheets 26, and therefore possible to certainly prevent a short circuit regardless of the form of the electrolyte.

According to the fourth embodiment, the insulating sheets disposed between the electrode groups are provided, and at least parts of the insulating sheets are joined to the container member, whereby a short circuit attributed to ion conduction caused by the contact between the electrolytes of the electrode groups can be inhibited.

Fifth Embodiment

A secondary battery 410 according to a fifth embodiment is described with reference to FIG. 8. The secondary battery 410 according to the fifth embodiment is configured so that part of the lead 23 is led to the outside of the container member 12. The secondary battery 410 is similar in other respects to the secondary battery 310 according to the fourth embodiment. The same configurations in the present embodiment as those in the previously described third embodiment are not repeatedly described.

In the secondary battery 410, of the three electrode groups 21, 21, 21, the electrode group 21 disposed in the middle in the Z-direction lies so that positive and negative connection pieces 31c and 32c are aligned in directions to be located opposite in the X-direction to those of the two electrode groups 21, 21 on both sides and connected in series. Specifically, the top and bottom electrode groups 21, 21 have the connection pieces 32c of positive electrodes led to one side, and the connection pieces 31c of negative electrodes led to the other side, in the X-direction.

The middle electrode group 21 has the connection pieces 32c of the positive electrodes led to the other side, and the connection pieces 31c of the negative electrodes led to one side, in the X-direction. A positive electrode tab 25 is connected to the connection pieces 32c of the positive electrodes of the electrode group 21 disposed on the top. An electrode tab 24 of the negative electrode is connected to the connection pieces 31c of the negative electrodes of the electrode group 21 disposed on the bottom. The connection pieces 32c of the positive electrodes of the middle electrode group 21 are connected to the connection pieces 31c of the negative electrodes of the top electrode group 21 by the lead 23, and the connection pieces 32c of the positive electrodes of the bottom electrode group 21 are connected to the connection pieces 31c of the negative electrodes of the middle electrode group 21 by the lead 23. The electrode tabs 24 and 25 extend to the outside of the container member 12.

The common pieces 23c, 23c of the leads 23, 23 are clamped by a pair of laminate films 12a and 12b of the container member 12, and have a predetermined length to reach the outside of the container member 12. That is, the lead 23 is led to the outside of the container member 12 from the ends of the electrode groups 21, 21 through the space between the laminate films 12a and 12b.

The pair of insulating sheets 26 have the whole outer periphery clamped between a pair of laminate films 12a and 12b of the container member 12 and then welded to the container member 12.

Advantageous effects similar to those in the previously described fourth embodiment are obtained in the present embodiment as well. That is, the space in the container member 12 is split into three parts by the insulating sheets 26, and the contact between the electrolytes of the electrode groups 21, 21, 21 is prevented, so that a short circuit can be prevented. Moreover, the insulating sheets 26 are joined to the container member 12 all around the periphery, and the spaces in the container member 12 can thus be liquid-tightly isolated from each other, so that it is possible to prevent even liquid electrolyte from entering the other region beyond the insulating sheet 26, and therefore possible to certainly prevent a short circuit regardless of the form of the electrolyte.

Furthermore, according to the secondary battery 410, the leads 23, 23 are exposed to the outside, and an external terminal can thus be electrically connected to the leads 23, 23. Therefore, the voltage of each of the electrode groups 21, 21 in the battery 410 can be independently monitored, leading to satisfactory maintenability.

According to the fifth embodiment, the insulating sheets are respectively disposed between three or more electrode groups, and at least parts of the insulating sheets are joined to the container member, whereby a short circuit attributed to ion conduction caused by the contact between the electrolytes of the electrode groups can be inhibited.

Sixth Embodiment

A secondary battery 510 according to a sixth embodiment is described with reference to FIG. 9. The secondary battery 510 according to the sixth embodiment comprises three electrode groups 21, and has a configuration in which the three electrode groups 21 are connected to each other by a pair of leads 223, respectively. The secondary battery 510 is similar in other respects to the secondary battery 210 according to the third embodiment. The same configurations in the present embodiment as those in the previously described third embodiment are not repeatedly described.

In the secondary battery 510, of the three electrode groups 21, 21, 21, the electrode group 21 disposed in the middle in the Z-direction lies so that positive and negative connection pieces 31c and 32c are aligned in directions to be located opposite in the X-direction to those of the two electrode groups 21, 21 on both sides and connected in series. Specifically, the top and bottom electrode groups 21, 21 have the connection pieces 32c of positive electrodes led to one side, and the connection pieces 31c of negative electrodes led to the other side, in the X-direction.

The middle electrode group 21 has the connection pieces 32c of the positive electrodes led to the other side, and the connection pieces 31c of the negative electrodes led to one side, in the X-direction. A positive electrode tab 25 is connected to the connection pieces 32c of the positive electrodes of the electrode group 21 disposed on the top. An electrode tab 24 of the negative electrode is connected to the connection pieces 31c of the negative electrodes of the electrode group 21 disposed on the bottom. The connection pieces 32c of the positive electrodes of the middle electrode group. 21 are connected to the connection pieces 31c of the negative electrodes of the top electrode group 21 by one lead 223, and the connection pieces 32c of the positive electrodes of the bottom electrode group 21 are connected to the connection pieces 31c of the negative electrodes of the middle electrode group 21 by the other lead 223. The electrode tabs 24 and 25 extend to the outside of the container member 12.

Each of the pair of leads 223, 223 which connects the electrode groups 21, 21 in series is formed into a strip shape having about the same Y-direction dimension as the electrode group 21.

One top lead 223 has one end connected to the connection pieces 31c on the negative electrode side of the top electrode group 21 and folded back downward, and has the other end connected to the connection pieces 32c on the positive electrode side of the middle electrode group 21. The other bottom lead 223 has one end connected to the connection pieces 31c on the negative electrode side of the middle electrode group 21 and folded back downward, and has the other end connected to the connection pieces 32c on the positive electrode side of the bottom electrode group 21.

In the secondary battery 510, a pair of insulating sheets 226 are strip-shaped. The width dimension of the insulating sheet 226 in the Y-direction is formed to be smaller than the width dimension of the container member 12 and larger than the width dimension of the electrode group 21. The insulating sheet 226 is folded back in a fold-back portion 226a disposed between the container member 12 and the end of the electrode group 21. The fold-back portion 226a is disposed outside a fold-back portion of the lead 223 at the end of the electrode group 21.

One top insulating sheet 226 has one end 226b in the longitudinal direction welded to the container member 12 together with the electrode tab 25 of the positive electrode on one side in the X-direction, has the sheet-shaped portion 226c on one end side extending to the other side in the X-direction through the space between the top electrode group 21 and the container member 12 and folded back downward in the fold-back portion 226a, and has the sheet-shaped portion 226d on the other end side returning to one side in the X-direction through the space between the bottom electrode group 21 and the middle electrode group 21 and reaching the fold-back portion of the bottom lead 223.

The other bottom insulating sheet 226 has one end 226b in the longitudinal direction welded to the container member 12 together with the electrode tab 24 of the negative electrode on the other side in the X-direction, has the sheet-shaped portion 226c on one end side extending to one side in the X-direction through the space between the bottom electrode group 21 and the container member 12 and folded back upward in the fold-back portion 226a, and has the sheet-shaped portion 226d on the other end side returning to the other side in the X-direction through the space between the top electrode group 21 and the middle electrode group 21 and reaching the fold-back portion of the top lead 223.

The pair of insulating sheets 226 have one end 226b and both edges 226e in the Y-direction clamped between and then welded to a pair of laminate films 12a and 12b of the container member 12, and are thereby joined to the container member 12.

Therefore, in the secondary battery 510, the pair of insulating sheets 226 insulate the three layers of electrode groups 21, 21, 21 from each other. The inside of the container member 12 is split into three parts in the Z-direction by the pair of top and bottom insulating sheets 226.

Advantageous effects similar to those in the previously described first embodiment are obtained in the secondary battery 510 according to the present embodiment as well. That is, the space in the container member 12 is split into three parts by the insulating sheets 226, and the contact between the electrolytes of the electrode groups 21, 21, 21 is prevented, so that a short circuit can be prevented.

According to the sixth embodiment, the insulating sheets are respectively disposed between three or more electrode groups, and at least parts of the insulating sheets are joined to the container member, whereby a short circuit attributed to ion conduction caused by the contact between the electrolytes of the electrode groups can be inhibited.

Seventh Embodiment

Figure 10:
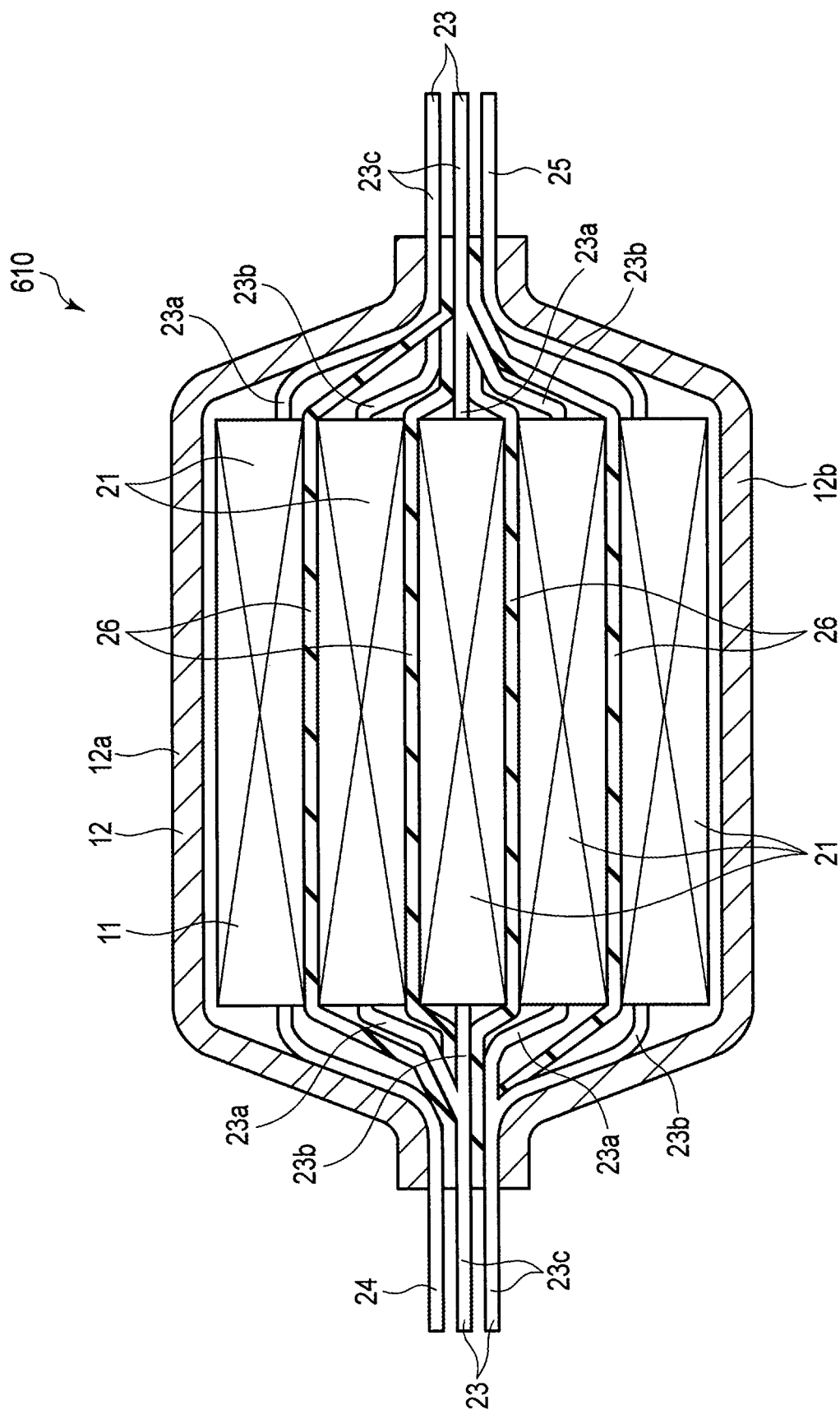
FIG. 10 is a sectional view showing the configuration of a secondary battery according to a seventh embodiment.

A secondary battery 610 according to a seventh embodiment is described with reference to FIG. 10. The secondary battery 610 according to the seventh embodiment comprises layers of five electrode groups 21 that are connected in series by four leads 23. The secondary battery 610 has four insulating sheets 26, and has a configuration in which an insulating sheet 26 intervenes between each pair of electrode groups 21 adjacent in the Z-direction. The secondary battery 610 is similar in other respects to the secondary battery 410 according to the fifth embodiment. The same configurations in the present embodiment as those in the previously described fifth embodiment are not repeatedly described.

In the secondary battery 510, the five electrode groups 21, 21, 21, 21, 21 are connected in series by the four leads 23. The electrode tab 24 is connected to the connection pieces 31c of the negative electrodes of the topmost electrode group 21. The electrode tab 25 is connected to the connection pieces 32c of the positive electrodes of the bottommost electrode group 21. The common pieces 23c of the electrode tabs 24 and 25 and the four leads 23 extend to the outside of the container member 12.

The insulating sheet 26 extends in the X-direction through the space between the electrode groups 21 adjacent in the Z-direction, and is inserted into the space between the negative electrode piece 23a and the positive electrode piece 23b of the lead 23.

The insulating sheet 26 has the outer peripheral edge clamped between and then welded to a pair of laminate films 12a and 12b of the container member 12. Four insulating sheets 26 are clamped by and then welded to the welded part 12c of the container member 12 all around the periphery.

Therefore, in the secondary battery 610, the five layers of electrode groups 21, 21, 21, 21, 21 are insulated by the four insulating sheets 26. Then the inside of the container member 12 is liquid-tightly split into five spaces in the Z-direction by the four insulating sheets 26.

Advantageous effects similar to those in the previously described fifth embodiment are obtained in the secondary battery 610 according to the present embodiment as well. That is, the space in the container member 12 is split into parts by the insulating sheets 26, and the contact between the electrolytes of the electrode groups 21 is prevented, so that a short circuit can be prevented. Moreover, the insulating sheets 26 are joined to the container member 12 all around the periphery, and the spaces in the container member 12 can thus be liquid-tightly isolated from each other, so that it is possible to prevent even liquid electrolyte from entering the other region beyond the insulating sheet 26, and therefore possible to certainly prevent a short circuit regardless of the form of the electrolyte.

Furthermore, according to the secondary battery 610, the leads 23 are exposed to the outside, and an external terminal can thus be electrically connected to the leads 23. Therefore, the voltage of each of the electrode groups 21 in the battery 610 can be independently monitored, leading to satisfactory maintenability.

According to the seventh embodiment, the insulating sheets are respectively disposed between three or more electrode groups, and at least parts of the insulating sheets are joined to the container member, whereby a short circuit attributed to ion conduction caused by the contact between the electrolytes of the electrode groups can be inhibited.

Eighth Embodiment

Figure 11:
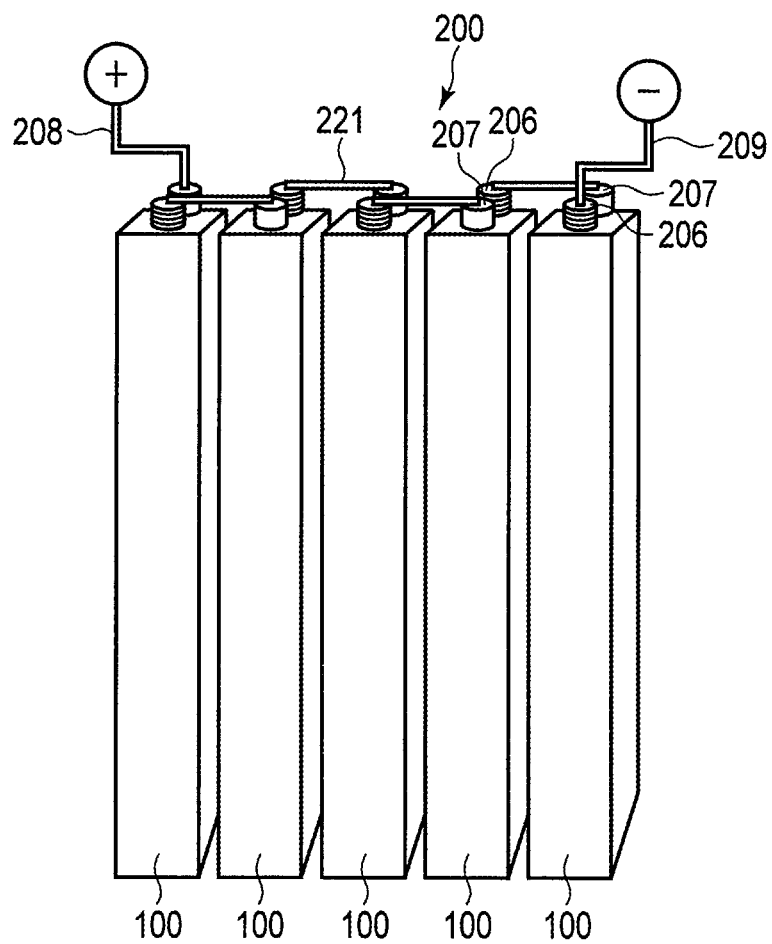
FIG. 11 is a perspective view schematically showing one example of a battery module according to an eighth embodiment.

A battery module 200 according to an eighth embodiment is described with reference to FIG. 11. FIG. 11 is a perspective view schematically showing one example of the battery module according to the eighth embodiment. The battery module has unit cells 100. Each of the unit cells may be electrically connected and arranged in series or in parallel, or may be arranged with a combination of serial connection and parallel connection. The battery module 200 shown in FIG. 11 comprises five unit cells 100, four bus bars 221, a positive electrode side lead 208, and a negative electrode side lead 209.

At least one of the unit cells 100 is, for example, one of the secondary batteries 10, 110, 210, 310, 410, 510, and 610 according to the first to seventh embodiments.

The bus bars 221 connect a negative electrode terminal 206 of one unit cell 100 to a positive electrode terminal 207 of the neighboring unit cell 100. In this way, the five unit cells 100 are connected in series by the four bus bars 221. That is, the battery module 200 in FIG. 11 is a five-series battery module.

As shown in FIG. 11, the positive electrode terminal 207 of the unit cell 100 located at the left end of one row, of the five unit cells 100, is connected to the positive electrode side lead 208 for external connection. The negative electrode terminal 206 of the unit cell 100 located at the right end of the other row, of the five unit cells 100, is connected to the negative electrode side lead 209 for external connection.

The battery module 200 according to the eighth embodiment uses the secondary batteries 10, 210, 310, 410, 510, and 610 as the unit cells 100, whereby in each of the unit cells 100, the space in the container member 12 is split into parts by the insulating sheet 26, and the contact between the electrolytes of the electrode groups 21 is prevented, so that a short circuit can be prevented. According to the eighth embodiment, the secondary battery comprising the insulating sheet disposed between the electrode groups is provided, so that it is possible to obtain advantageous effects of preventing contact between the electrolytes and preventing a short circuit.

Ninth Embodiment

A battery pack 300 according to Ninth embodiment is described below with reference to FIG. 12 and FIG. 13. FIG. 12 is a perspective view schematically showing an example of the battery module according to the third embodiment. FIG. 12 is an exploded perspective view schematically showing an example of the battery pack according to the fourth embodiment. FIG. 13 is a block diagram showing an example of an electric circuit of the battery pack shown in FIG. 12.

A battery pack 300 shown in FIGS. 13 and 13 includes a housing container 331, a lid 332, protective sheets 333, a battery module 200, a printed wiring board 334, wires 335, and an insulating plate (not shown). The battery module 200 is the battery module 200 according to the eighth embodiment and the battery module 200 has one or more secondary batteries 10 110, 210, 310, 410, 510, or 610.

The housing container 331 is configured to house the protective sheets 333, the battery module 200, the printed wiring board 334, and the wires 335. The lid 332 covers the housing container 331 to house the battery module 200 and the like. Although not shown, opening(s) or connection terminal(s) for connecting to external device(s) and the like are provided on the housing container 331 and lid 332.

The protective sheets 333 are arranged on both inner surfaces of the housing container 331 along the long-side direction and on the inner surface along the short-side direction, facing the printed wiring board 334 across the battery module 200 positioned therebetween. The protective sheets 333 are made of, for example, resin or rubber.

The battery module 200 includes plural single-batteries 100, a positive electrode-side lead 208, a negative electrode-side lead 209, and an adhesive tape 224. The battery module 200 may alternatively include only one single-battery 100.

At least one of the unit cells 100 is, for example, one of the secondary batteries 10, 110, 210, 310, 410, 510, and 610 according to the first to seventh embodiments.

The plural single-batteries 100 are stacked such that the negative electrode terminals 206 and the positive electrode terminals 207, which extend outside, are directed toward the same direction. The plural single-batteries 100 are electrically connected in series, as shown in FIG. 14. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 224 fastens the plural single-batteries 100. The plural single-batteries 100 may be fixed using a heat-shrinkable tape in place of the adhesive tape 224. In this case, the protective sheets 333 are arranged on both side surfaces of the battery module 200, and the heat-shrinkable tape is wound around the battery module 200 and protective sheets 333. After that, the heat-shrinkable tape is shrunk by heating to bundle the plural single-batteries 100.

One end of the positive electrode-side lead 208 is connected to the positive electrode terminal 207 of the single-battery 100 located lowermost in the stack of the single-batteries 100. One end of the negative electrode-side lead 209 is connected to the negative electrode terminal 206 of the single-battery 100 located uppermost in the stack of the single-batteries 100.

The printed wiring board 334 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 334 faces the surface of the battery module 200 from which the negative electrode terminals 206 and the positive electrode terminals 207 extend out. An insulating plate (not shown) is disposed in between the printed wiring board 334 and the battery module 200.

The positive electrode-side connector 341 is provided with a through hole. By inserting the other end of the positive electrode-side lead 208 into the though hole, the positive electrode-side connector 341 and the positive electrode-side lead 208 become electrically connected. The negative electrode-side connector 342 is provided with a through hole. By inserting the other end of the negative electrode-side lead 209 into the though hole, the negative electrode-side connector 342 and the negative electrode-side lead 209 become electrically connected.

The thermistor 343 is fixed to one principal surface of the printed wiring board 334. The thermistor 343 detects the temperature of each single-battery 100 and transmits detection signals to the protective circuit 344.

The external power distribution terminal 347 is fixed to the other principal surface of the printed wiring board 334. The external power distribution terminal 347 is electrically connected to device(s) that exists outside the battery pack 300.

The protective circuit 344 is fixed to the other principal surface of the printed wiring board 334. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 335.

The protective circuit 344 controls charge and discharge of the plural single-batteries 100. The protective circuit 344 is also configured to cut-off electric connection between the protective circuit 344 and the external power distribution terminal 347, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 334 and the wires 335 may be omitted. In this case, the positive electrode-side lead 208 and the negative electrode-side lead 209 may be used as the external power distribution terminal.

The battery pack 300 according to the ninth embodiment comprises the secondary batteries 10, 210, 310, 410, 510, and 610 according to the first to seventh embodiments and the battery module 200 according to the eighth embodiment, whereby in each of the unit cells 100, the space in the container member 12 is split into parts by the insulating sheet 26, and the contact between the electrolytes of the electrode groups 21 is prevented, so that a short circuit can be prevented.

According to the ninth embodiment, the secondary battery comprising the insulating sheet disposed between the electrode groups is provided, so that it is possible to obtain advantageous effects of preventing contact between the electrolytes and preventing a short circuit.

The battery pack 300 may comprise a single secondary battery 10, 210, 310, 410, 510, or 610 instead of the battery module 200 according to the eighth embodiment.

The battery pack 300 according to the ninth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack 300 according to the fourth embodiment may further comprise an external power distribution terminal. The external power distribution terminal is configured to externally output current from the secondary battery, and to input external current into the secondary battery. In other words, when the battery pack 300 is used as a power source, the current is provided out via the external power distribution terminal. When the battery pack 300 is charged, the charging current (including regenerative energy of motive force of vehicles such as automobiles) is provided to the battery pack via the external power distribution terminal.

Tenth Embodiment

A vehicle 400 according to a tenth embodiment is described with reference to FIG. 14. FIG. 14 is a sectional view schematically showing one example of the vehicle 400 according to the tenth embodiment.

The vehicle 400 shown in FIG. 14 includes a vehicle main body 440, and the battery pack 300 according to the ninth embodiment. Examples of the vehicle 400 include two to four-wheeled hybrid electric automobiles, two to four-wheeled electric automobiles, assist bicycles, and railway cars.

In the vehicle 400, the battery pack 300, for example, recovers regenerative energy of power of the vehicle.

The battery pack 300 comprises the battery module 200 according to the eighth embodiment. The battery module 200 comprises the unit cells 100 that are connected in series. At least one of the unit cells 100 is, for example, one of the secondary batteries 10, 110, 210, 310, 410, 510, and 610 according to the first to seventh embodiments.

The vehicle 400 shown in FIG. 14 is a four-wheeled automobile. For example, a two to four-wheeled hybrid electric automobile, a two to four-wheeled electric automobile, an assist bicycles, or a railway car can be used as the vehicle 400.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400. The battery pack 300 can also recover regenerative energy of motive force of the vehicle 400.

The vehicle 400 according to the tenth embodiment comprises the secondary batteries 10, 110, 210, 310, 410, 510, and 610 according to the first to seventh embodiments as the unit cells 100, whereby short circuits in the unit cells 100 can be prevented.

According to the vehicle in the tenth embodiment, the secondary battery comprising the insulating sheet disposed between the electrode groups is provided, so that it is possible to obtain advantageous effects of preventing contact between the electrolytes and preventing short circuits in the unit cells.

Eleventh Embodiment

An example of the vehicle 400A according to the eleventh embodiment is explained below, with reference to FIG. 15. FIG. 15 is a cross-sectional view schematically showing an example of a vehicle 400A according to the eleventh embodiment.

A vehicle 400A, shown in FIG. 15, is an electric automobile.

The vehicle 400A, shown in FIG. 15, includes a vehicle body 440, a vehicle power source 441, a vehicle ECU (electric control unit) 442, which is a master controller of the vehicle power source 441, an external terminal (an external power connection terminal) 443, an inverter 444, and a drive motor 445.

The vehicle 400 includes the vehicle power source 441, for example, in the engine compartment, in the rear sections of the automobile body, or under a seat. In FIG. 15, the position of the vehicle power source 441 installed in the vehicle 400 is schematically shown.

The vehicle power source 441 includes plural (for example, three) battery packs 300, a battery management unit (BMU) 411, and a communication bus 412.

The three battery packs 300 are electrically connected in series. The battery pack 300 includes a battery module 200 and a battery module monitoring unit (VTM: voltage temperature monitoring) 301. The battery packs 300 can each be independently removed, and may be exchanged by a different battery pack 300.

At least one of the three battery packs 300 is the battery pack 300 according to the ninth embodiment and at least one of the plural battery modules 200 is one of the battery modules 300 according to the eighth embodiment.

Each of the battery modules 200 includes plural single-batteries 100 connected in series. At least one of the plural single-batteries 100 is the secondary battery 10 110, 210, 310, 410, 510, or 610 according to anyone of the first to seventh embodiments. The battery modules 200 each perform charging and discharging via a positive electrode terminal 413 and a negative electrode terminal 414.

In order to collect information concerning security of the vehicle power source 441, the battery management unit 411 performs communication with the battery module monitoring units 301 and collects information such as voltages or temperatures of the single-batteries 100 included in the battery modules 200 included in the vehicle power source 441.

The communication bus 412 is connected between the battery management unit 411 and the battery module monitoring units 301. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301 measure a voltage and a temperature of each single-battery in the battery modules 200 based on commands from the battery management unit 411. It is possible, however, to measure the temperatures only at several points per battery module, and the temperatures of all of the single-batteries need not be measured.

The vehicle power source 441 may also have an electromagnetic contactor (for example, a switch unit 415 shown in FIG. 10) for switching connection between the positive electrode terminal 413 and the negative electrode terminal 414. The switch unit 415 includes a precharge switch (not shown), which is turned on when the battery modules 200 are charged, and a main switch (not shown), which is turned on when battery output is supplied to a load. The precharge switch and the main switch include a relay circuit (not shown), which is turned on or off based on a signal provided to a coil disposed near a switch element.

The inverter 444 converts an inputted direct current voltage to a three-phase alternate current (AC) high voltage for driving a motor. Three-phase output terminal(s) of the inverter 444 is (are) connected to each three-phase input terminal of the drive motor 45. The inverter 444 controls an output voltage based on control signals from the battery management unit 411 or the vehicle ECU 441, which controls the entire operation of the vehicle.

The drive motor 445 is rotated by electric power supplied from the inverter 444. The rotation is transferred to an axle and driving wheels W via a differential gear unit, for example.

The vehicle 400 also includes a regenerative brake mechanism, though not shown. The regenerative brake mechanism rotates the drive motor 445 when the vehicle 400 is braked, and converts kinetic energy into regenerative energy, as electric energy. The regenerative energy, recovered in the regenerative brake mechanism, is inputted into the inverter 444 and converted to direct current. The direct current is inputted into the vehicle power source 441.

One terminal of a connecting line L1 is connected via a current detector (not shown) in the battery management unit 411 to the negative electrode terminal 414 of the vehicle power source 441. The other terminal of the connecting line L1 is connected to a negative electrode input terminal of the inverter 444.

One terminal of a connecting line L2 is connected via the switch unit 415 to the positive electrode terminal 413 of the vehicle power source 441. The other terminal of the connecting line L2 is connected to a positive electrode input terminal of the inverter 444.

The external terminal 443 is connected to the battery management unit 411. The external terminal 443 is able to connect, for example, to an external power source.

The vehicle ECU 442 cooperatively controls the battery management unit 411 together with other units in response to inputs operated by a driver or the like, thereby performing the management of the whole vehicle. Data concerning the security of the vehicle power source 441, such as a remaining capacity of the vehicle power source 441, are transferred between the battery management unit 411 and the vehicle ECU 442 via communication lines.

The vehicle 400A according to the eleventh embodiment is equipped with the battery pack 300 according to the ninth embodiment. Therefore, the vehicle 400A comprises the secondary batteries 10, 110, 210, 310, 410, 510, and 610 according to the first to seventh embodiments as the unit cells 100, whereby short circuits in the unit cells 100 can be prevented.

According to the vehicle in the eleventh embodiment, the secondary battery comprising the insulating sheet disposed between the electrode groups is provided, so that it is possible to obtain advantageous effects of preventing contact between the electrolytes and preventing short circuits in the unit cells.

Examples are described below.

To ascertain the advantageous effects of the secondary batteries 10, 110, 210, 310, 410, 510, and 610 according to the first to seventh embodiments having the configurations described above, Examples 1 to 12 and Comparative Examples 1 to 9 of configurations shown below were used to conduct a test to compare the number of defects during high-temperature storage, a discharge capacity retention ratio (%), and whether voltage is detectable/undetectable.

Example 1

Example 1 included the configuration of the secondary battery 10 according to the first embodiment. A polypropylene sheet was used as the insulating sheet 26, and two electrode groups 21 which were substantially rectangular parallelepipeds were stacked via the polypropylene sheet. The electrode groups 21 were contained in the aluminum laminate container member 12, and the outer periphery of the polypropylene sheet was welded to the aluminum laminate container member 12. An electrolyte was contained in the container member 12 together with the electrode groups 21, 21. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator.

Example 2

Example 2 included the configuration of the secondary battery 10 according to the first embodiment. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material. Cellulose was used as a separator. The method was similar in other respects to that in Example 1.

Example 3

Example 3 included the configuration of the secondary battery 110 according to the second embodiment. Welding was conducted in a state where the lead 23 was led out from the end of the aluminum laminate container member 12. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 1.

Example 4

Example 4 included the configuration of the secondary battery 110 according to the second embodiment. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material. Cellulose was used as a separator. The method was similar in other respects to that in Example 3.

Example 5

Example 5 included the configuration of the secondary battery 210 according to the third embodiment. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 1.

Example 6

Example 6 included the configuration of the secondary battery 310 according to the fourth embodiment. Three electrode groups 21, 21, 21 were stacked via the insulating sheets 26, and the outer peripheries of the insulating sheets 26 were welded to the container member 12. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 1.

Example 7

Example 7 included the configuration of the secondary battery 310 according to the fourth embodiment. In Example 7, three electrode groups 21, 21, 21 were stacked via the insulating sheets 26, and the outer peripheries of the insulating sheets 26 were welded to the container member 12. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material. Cellulose was used as a separator. The method was similar in other respects to that in Example 6.

Example 8

Example 8 included the configuration of the secondary battery 410 according to the fifth embodiment. Welding was conducted in a state where the lead 23 extended to the outside from the end of the aluminum laminate container member 12. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 6.

Example 9

Example 9 included the configuration of the secondary battery 410 according to the fifth embodiment. Welding was conducted in a state where the lead 23 extended to the outside from the end of the aluminum laminate container member 12. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material.

Cellulose was used as a separator. The method was similar in other respects to that in Example 8.

Example 10

Example 10 included the configuration of the secondary battery 510 according to the sixth embodiment. As shown in FIG. 9, the insulating sheets 26 were folded back at the electrode group ends. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 6.

Example 11

Example 11 included the configuration of the secondary battery 610 according to the seventh embodiment. As shown in FIG. 10, five electrode groups 21 were stacked via the insulating sheets 26, and the outer peripheries of the insulating sheets 26 were welded to the container member 12. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. The method was similar in other respects to that in Example 8.

Example 12

Example 12 included the configuration of the secondary battery 610 according to the seventh embodiment. As shown in FIG. 10, five electrode groups 21 were stacked via the insulating sheets 26, and the outer peripheries of the insulating sheets 26 were welded to the container member 12. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material. Cellulose was used as a separator. The method was similar in other respects to that in Example 11.

Comparative Example 1

Comparative Example 1 included the configuration of the secondary battery 10 according to the first embodiment in which the insulating sheet 26 was omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 1 was similar to Example 1 except that the insulating sheet was not used.

Comparative Example 2

Comparative Example 2 included the configuration of the secondary battery 10 according to the first embodiment in which the insulating sheet 26 was omitted. A liquid electrolyte solution in which 1M of $LiPF_6$ was dissolved into a mixed solvent of propylene carbonate and diethyl carbonate (volume ratio of 1:1) was used as an electrolyte. Lithium cobalt oxide was used as a positive electrode active material, and spinel type lithium titanate was used as a negative electrode active material. Cellulose was used as a separator. Comparative Example 2 was similar to Example 1 except that the insulating sheet was not used.

Comparative Example 3

Comparative Example 3 included the configuration of the secondary battery 10 according to the first embodiment in which the insulating sheet 26 was omitted. $Li_7La_3Zr_2O_{12}$ which was a solid electrolyte was used as an electrolyte. Lithium cobalt oxide was used as a positive electrode active material, and spinel type lithium titanate was used as a negative electrode active material. In Comparative Example 3, a solid electrolyte layer was used instead of a separator.

Comparative Example 4

Comparative Example 4 included the configuration of the secondary battery 110 according to the second embodiment in which the insulating sheet 26 was omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 4 was similar to Example 3 except that the insulating sheet was not used.

Comparative Example 5

Comparative Example 5 included the configuration of the secondary battery 210 according to the third embodiment in which the insulating sheets 226 were omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 5 was similar to Example 5 except that the insulating sheets were not used.

Comparative Example 6

Comparative Example 6 included the configuration of the secondary battery 410 according to the fifth embodiment in which the insulating sheets 26 were omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 6 was similar to Example 6 except that the insulating sheets were not used.

Comparative Example 7

Comparative Example 7 included the configuration of the secondary battery 510 according to the sixth embodiment in which the insulating sheets 26 were omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 7 was similar to Example 8 except that the insulating sheets were not used.

Comparative Example 8

Comparative Example 8 included the configuration of the secondary battery 510 according to the sixth embodiment in which the insulating sheets 26 were omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 8 was similar to Example 10 except that the insulating sheets were not used.

Comparative Example 9

Comparative Example 9 included the configuration of the secondary battery 610 according to the seventh embodiment in which the insulating sheets 26 were omitted. A gel electrolyte solution in which 1M of $LiPF_6$ was dissolved into a mixed solvent of propylene carbonate and diethyl carbonate (volume ratio of 1:1) and which was turned into a gel by the mixture of polyacrylonitrile was used as an electrolyte. Lithium cobalt oxide was used as a positive electrode active material, and spinel type lithium titanate was used as a negative electrode active material. Cellulose was used as a separator. Comparative Example 9 was similar to Example 11 except that the insulating sheets were not used.

Ten of each of the secondary batteries according to Examples 1 to 12 and Comparative Examples 1 to 9 were produced. Each secondary battery was charged to 2.8×(the number of electrode groups) V, and then discharged to 1.5 V×(the number of electrode groups) at a discharge rate of 1 C, and 1 C discharge capacity was measured. Each secondary battery was again charged to 2.8×(the number of electrode groups) V, and then discharged to 1.5×(the number of electrode groups) V at a discharge rate of 5 C, and 5 C discharge capacity was thereby measured. A 5 C discharge capacity retention ratio of each secondary battery was found by 5 C discharge capacity retention ratio (%)=5 C discharge capacity/1 C discharge capacity×100.

Furthermore, each secondary battery was charged to 2.4×(the number of electrode groups) V, and then a storage test was conducted for 168 hours under an environment at 60° C. The voltage of each secondary battery after the storage was measured, and when the voltage was less than 2.3×(the number of electrode groups) V, the secondary battery was regarded as defective.

Table 1 shows the number of defects after the 60° C. storage test, the 5 C discharge capacity retention ratio, and whether voltage of each electrode group is detectable/undetectable, regarding the secondary batteries according to Examples 1 to 12 and Comparative Examples 1 to 9.

TABLE 1

| | Form of secondary battery | Presence of insulating sheet | Electrolyte | Number of defects after 60° C. storage | 5 C discharge capacity retention ratio | Whether voltage of each electrode group is detectable/undetectable |
|---|---|---|---|---|---|---|
| Example 1 | First embodiment secondary battery 10 | Present | Gel | 0 | 85 | Undetectable |
| Example 2 | First embodiment secondary battery 10 | Present | Solution | 0 | 90 | Undetectable |
| Example 3 | Second embodiment secondary battery 110 | Present | Gel | 0 | 85 | Detectable |
| Example 4 | Second embodiment secondary battery 110 | Present | Solution | 0 | 90 | Detectable |
| Example 5 | Third embodiment secondary battery 210 | Present | Gel | 0 | 80 | Undetectable |
| Example 6 | Fourth embodiment secondary battery 310 | Present | Gel | 0 | 80 | Undetectable |
| Example 7 | Fourth embodiment secondary battery 310 | Present | Solution | 0 | 85 | Undetectable |
| Example 8 | Fifth embodiment secondary battery 410 | Present | Gel | 0 | 80 | Detectable |
| Example 9 | Fifth embodiment secondary battery 410 | Present | Solution | 0 | 85 | Detectable |
| Example 10 | Sixth embodiment secondary battery 510 | Present | Gel | 0 | 80 | Undetectable |
| Example 11 | Seventh embodiment secondary battery 610 | Present | Gel | 0 | 75 | Detectable |
| Example 12 | Seventh embodiment secondary battery 610 | Present | Solution | 0 | 80 | Detectable |
| Comparative Example 1 | First embodiment | Absent | Gel | 3 | 85 | Undetectable |
| Comparative Example 2 | First embodiment | Absent | Solution | 10 | — | Undetectable |
| Comparative Example 3 | First embodiment | Absent | Solid | 0 | 10 | Undetectable |
| Comparative Example 4 | Second embodiment | Absent | Gel | 3 | 85 | Detectable |

TABLE 1-continued

|  | Form of secondary battery | Presence of insulating sheet | Electrolyte | Number of defects after 60° C. storage | 5 C discharge capacity retention ratio | Whether voltage of each electrode group is detectable/undetectable |
|---|---|---|---|---|---|---|
| Comparative Example 5 | Third embodiment | Absent | Gel | 1 | 80 | Undetectable |
| Comparative Example 6 | Fourth embodiment | Absent | Gel | 3 | 80 | Undetectable |
| Comparative Example 7 | Fifth embodiment | Absent | Gel | 3 | 80 | Detectable |
| Comparative Example 8 | Sixth embodiment | Absent | Gel | 3 | 80 | Undetectable |
| Comparative Example 9 | Seventh embodiment | Absent | Gel | 4 | 75 | Detectable |

As shown in Table 1, 1 to 4 defects are produced in the secondary batteries according to Comparative Examples 1, 2 and, 4 to 9, whereas no defects are produced in the secondary batteries according to Examples 1 to 12. This can be said to be attributed to the fact that the secondary batteries according to Examples comprise the insulating sheets 26, 226 and thus prevent liquid junction even when the liquid electrolyte solution is used or the gel electrolyte solution softens.

As shown in Comparative Example 3, when the solid electrolyte is used as the electrolyte, the electrode groups can be connected in series in the battery without liquid junction even if no insulating sheet is used, but the discharge capacity significantly decreases during high-current discharge as indicated by the 5 C discharge capacity retention ratio because the solid electrolyte is lower in lithium ion conductivity than the liquid electrolyte solution and the gel electrolyte solution.

In the secondary battery according to Comparative Example 2, the 5 C discharge capacity retention ratio could not be calculated because all the produced 10 unit cells could not be charged to 2.8×(the number of electrode groups) V.

Furthermore, the forms of Examples 3, 4, 8, 9, and 10 to 12 enable the voltage of each electrode group to be sensed.

The present invention is not completely limited to each of the embodiments described above, and it is possible to modify the components without departing from the spirit of the invention at the implementation phase thereof.

The insulating sheet 26 may be welded to at least part of the container member 12. Even in this case, a short circuit can be prevented by the isolation of the electrolyte.

The electrode group 21 is a stacking type in the examples shown in the embodiments described above, but is not limited thereto. For example, a flat type wound electrode group 21A shown in FIG. 16 and FIG. 17 may be used instead of the stacking type. FIG. 16 is a side view of the wound electrode group 21A. FIG. 17 is a sectional view showing a part A of FIG. 16 in enlarged form. The electrode group 21A includes a negative electrode 31, a separator 33, and a positive electrode 32. The wound electrode group 21A has the separator 33 put between the negative electrode 31 and the positive electrode 32, and is wound more than one time. Even when the wound electrode group 21A is used, advantageous effects similar to those in each of the previously described embodiments above are obtained. Otherwise, a folded electrode group may be used.

As the electrolyte, an aqueous electrolyte may be used instead of the liquid nonaqueous electrolyte and the gel like nonaqueous electrolyte illustrated in the embodiments described above, or a solid electrolyte can also be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A secondary battery comprising:
   a stack comprising electrode groups and an electrically and ion-conductively insulating sheet disposed between the electrode groups, wherein the electrode groups each comprise, in a form of stacked layers, a positive electrode, a negative electrode, and a separator disposed between the positive electrode and the negative electrode;
   a lead which electrically connects the electrode groups to each other over part of an outer peripheral edge of the insulating sheet; and
   a container member to which at least part of the insulating sheet is joined and which covers the outside of the stack,
   wherein the container member comprises a plurality of films opposed to each other and clamping the outer peripheral edge of the insulating sheet in between.

2. The secondary battery according to claim 1, wherein the insulating sheet has at least part of an outer peripheral edge thereof protruding outward more than outer peripheral edges of the electrode groups and then joined to the container member, and the insulating sheet divides an internal space of the container member into parts in a first direction which is a stacking direction of the electrode groups,
   the secondary battery further comprising an electrode tab connected to the electrode groups and led to the outside of the container member, and
   a lead which electrically connects the electrode groups to each other.

3. The secondary battery according to claim 2, wherein at least part of the lead is led to the outside of the container member.

4. The secondary battery according to claim 1, further comprising an electrolyte held in each of the electrode groups, and wherein a whole peripheral edge of the insulating sheet is joined to the container member.

5. The secondary battery according to claim 1, comprising three or more electrode groups, wherein the insulating sheet is disposed between adjacent two of the three or more electrode groups.

6. The secondary battery according to claim 2, wherein the insulating sheet is folded back between the container member and an end of each of the electrode groups, and covers both sides of each of the electrode groups in the first direction.

7. The secondary battery according to claim 1, wherein the lead is folded or branches at a location outside said part of the outer peripheral edge of the insulating sheet.

8. The secondary battery according to claim 1, wherein each of the electrode groups and the insulating sheet are disposed without the container member therebetween.

9. The secondary battery according to claim 1, wherein the insulating sheet is a partition between the electrode groups in the container member.

10. A battery pack comprising the secondary battery according to claim 1.

11. The battery pack according to claim 10, further comprising:
an external power distribution terminal; and
a protective circuit.

12. The battery pack according to claim 10, comprising plural secondary batteries, the plural secondary batteries being electrically connected in series, in parallel, or in combination of in series and in parallel.

13. A vehicle comprising the battery pack according to claim 10.

14. The vehicle according to claim 13, which further comprises a mechanism configured to convert kinetic energy of the vehicle into regenerative energy.

* * * * *